US011298295B2

(12) United States Patent
Bartos

(10) Patent No.: US 11,298,295 B2
(45) Date of Patent: Apr. 12, 2022

(54) SYSTEM AND METHOD FOR MEDICATION ADHERENCE MANAGEMENT

(71) Applicant: BOEHRINGER INGELHEIM INTERNATIONAL GMBH, Ingelheim am Rhein (DE)

(72) Inventor: Holger Bartos, Dortmund (DE)

(73) Assignee: BOEHRINGER INGELHEIM INTERNATIONAL GMBH, Ingelheim am Rhein (DE)

( * ) Notice: Subject to any disclaimer, the term of this patent is extended or adjusted under 35 U.S.C. 154(b) by 242 days.

(21) Appl. No.: 16/339,760

(22) PCT Filed: Oct. 9, 2017

(86) PCT No.: PCT/EP2017/025303
§ 371 (c)(1),
(2) Date: Apr. 5, 2019

(87) PCT Pub. No.: WO2018/065122
PCT Pub. Date: Apr. 12, 2018

(65) Prior Publication Data
US 2019/0307648 A1 Oct. 10, 2019

(30) Foreign Application Priority Data

Oct. 7, 2016 (EP) ..................................... 16002167
Nov. 23, 2016 (EP) ..................................... 16020462
(Continued)

(51) Int. Cl.
*A61J 7/02* (2006.01)
*A61J 1/16* (2006.01)
(Continued)

(52) U.S. Cl.
CPC ............... *A61J 7/0436* (2015.05); *A61J 1/16* (2013.01); *A61J 7/0418* (2015.05); *A61J 7/0481* (2013.01);
(Continued)

(58) Field of Classification Search
CPC .......... A61J 7/0436; A61J 7/0418; A61J 1/16; A61J 7/0481; A61J 7/0076; A61J 2200/30;
(Continued)

(56) References Cited

U.S. PATENT DOCUMENTS 4,939,705 A * 7/1990 Hamilton ............... A61J 7/0436
368/10
5,170,380 A * 12/1992 Howard ................ A61J 7/0472
221/15
(Continued)

FOREIGN PATENT DOCUMENTS

JP 2005059833 A 3/2005
JP 2009112673 A 5/2009
(Continued)

*Primary Examiner* — Randy W Gibson
(74) *Attorney, Agent, or Firm* — David S. Safran; Roberts Calderon Safran & Cole, P.C.

(57) ABSTRACT

A system and a method for medication adherence management with which a medicament container is held by a holding apparatus, a detector device wirelessly recognizes an opening and closing activity of the medicament container, and a data processing device or control device reads and processes data of the detector device.

40 Claims, 14 Drawing Sheets

(30) Foreign Application Priority Data

Mar. 29, 2017 (EP) ..................................... 17000514
Jun. 7, 2017 (EP) ..................................... 17020243

(51) Int. Cl.

| | |
|---|---|
| *A61J 7/04* | (2006.01) |
| *G01G 19/414* | (2006.01) |
| *G01G 19/42* | (2006.01) |
| *G01G 19/52* | (2006.01) |
| *A61J 7/00* | (2006.01) |

(52) U.S. Cl.
CPC ......... *G01G 19/4144* (2013.01); *G01G 19/42* (2013.01); *G01G 19/52* (2013.01); *A61J 7/0076* (2013.01); *A61J 2200/30* (2013.01); *A61J 2200/74* (2013.01); *A61J 2205/50* (2013.01); *A61J 2205/60* (2013.01)

(58) Field of Classification Search
CPC ................ A61J 2200/74; A61J 2205/50; A61J 2205/60; G01G 19/414; G01G 19/42; G01G 19/4144; G01G 21/28; G01G 21/52; G01G 19/52
See application file for complete search history.

(56) References Cited

U.S. PATENT DOCUMENTS

| | | | |
|---|---|---|---|
| 5,228,485 A * | 7/1993 | Lewis | B67D 1/108 141/83 |
| 5,710,551 A | 1/1998 | Ridgeway | |
| 5,774,865 A * | 6/1998 | Glynn | A61J 7/0454 705/2 |
| 8,045,420 B2 * | 10/2011 | Newman | A61J 7/0084 368/10 |
| 8,754,769 B2 * | 6/2014 | Stein | A61J 7/0409 340/540 |
| 10,366,207 B2 * | 7/2019 | Fateh | G16H 20/10 |
| 2005/0151625 A1 | 7/2005 | Lai | |
| 2010/0243103 A1 | 9/2010 | Ono et al. | |
| 2013/0002795 A1 | 1/2013 | Shavelsky et al. | |
| 2015/0257981 A1 | 9/2015 | Arad et al. | |
| 2016/0136055 A1 | 5/2016 | Burrows et al. | |
| 2016/0220180 A1 | 8/2016 | Fateh | |

FOREIGN PATENT DOCUMENTS

| | | |
|---|---|---|
| WO | 2005004787 A1 | 1/2005 |
| WO | 2006035278 A1 | 4/2006 |
| WO | 2013127564 A1 | 9/2013 |

* cited by examiner

SYSTEM AND METHOD FOR MEDICATION ADHERENCE MANAGEMENT

BACKGROUND OF THE INVENTION

Field of the Invention

The present invention relates to a medication adherence management system and a method for medication adherence management, that allow for the organization, monitoring, control and/or assistance in medication applications for patients.

Medication adherence management is often necessary to ensure the correct application of a medication plan, i.e. in cases when a patient is prescribed a certain medicine that has to be taken according to a specific schedule. In particular, elderly people often struggle with keeping track of the intake of their medicine, especially when they are confronted with a large variety of different medicaments. For example, due to a memory loss increasing with age patients can forget to take their medicine at the appropriate times or cannot remember whether they have already taken their medicine.

Segmented pillboxes can be used as a basic assistance for patients applying medication segmented. Such pillboxes commonly comprise several compartments, for example, for different times of a day and different days of a week. However, in cases of patients suffering from severe age-induced limitations, it is often necessary to also monitor the intake of the medicine and the adherence to the schedule of a medication plan. In this regard, a common approach is to monitor the access of the patient to the medicament dispenser, such as a pillbox.

Description of Related Art

U.S. Pat. No. 5,710,551 discloses a system wherein a pillbox is placed in a special housing that covers the pillbox with a lid. Accessing the medicine placed in the system is registered by means of a switch associated with the lid. By monitoring the switch signal the adherence of the patient to the medication schedule can be monitored from a remote location.

Another system that is proposed in U.S. Patent Application Publication No. 2013/0002795 A1 comprises an array of medicament containers in the form of cups each containing an individual medicament dose. The cups are covered by individual lids. In addition to a monitoring of hinges of an overall pillbox cover, the individual lids can also be monitored for the detection of a single cup access. The monitoring of the individual cups can be carried out by a switch associated with the lid or by detection of the proximity of a patient's finger or the like.

The aforementioned medication monitoring systems share the common disadvantage that they require a high effort to prepare the pillboxes for use. In particular, the individual cups or compartments of the special medicament containers to be used with the known systems for medication monitoring have to be filled from a bulk reservoir or blister packages or pill bottles from pharmaceutical manufacturers by the pharmacist, caregiver, patient or someone else prior to use. The need to transfer pills from one or more packages to a medicament container/medication monitoring system can provide a source of error and might lead to a different stability of the medicament in the medicament container/medication monitoring system. Known prior art systems, therefore, suffer from the combined disadvantages of the need for a high preparation effort and the danger of preparation errors and a possibly restrained stability of the medicament.

U.S. Patent Application Publication No. 2016/0136055 A1 discloses a system which provides either an electronics module that can be attached to a conventional pharmaceutical container, or a sleeve comprising electronics into which such a container can be installed, or a custom pharmaceutical container in which the electronics are built directly into the container. The system comprises means for detecting an opening of the container, in particular a lever which is pushed down by a lid of the container when the container is closed and released when the lid is removed. The system can further comprise a tilt sensor and a real time clock. A valid dose event is logged by the system when an opening and tilting of the container is detected simultaneously for a certain time like a few seconds.

International Patent Application Publication No. WO 2006/035278 A1 discloses a medication monitor that includes a body that houses a removable medication container, a cellular telephone module and a switch that is activated when a lid of the medication container is opened or the medication container is removed from the housing. The cellular telephone module is operable to transmit an SMS text message to a remotely accessible processor when the medication container is accessed, that means when the lid is opened or the container is removed from the housing.

International Patent Application Publication No. WO 2013/127564 A1 discloses a system for monitoring drug compliance using high resolution force sensing. The system comprises a medication container holder into which a standard medication container can be inserted. The system further comprises a weight sensor which is capable of detecting a weight decrease of the container, for example when removing a single pill, and hence the system monitors medicine consumption through said weight sensor. For different medication containers, the medication container holder can be replaced by re-attaching it to the weight sensor.

The aforementioned systems overcome the disadvantage of the need for a high preparation afford by providing systems operating with the initial medicament container, however, at the cost of having an unreliable and/or very complicated mechanism for registering a medication activity, and/or having limited usability. In particular, registering a medication activity when the lid is opened might not be sufficient. However, providing other measurement means makes the adherence management system unnecessarily complicated. Furthermore, the systems are either designed to fit only a specific medicament container and to adapt the system to be usable with differently sized and/or shaped containers is very complicated, where certain parts of the system need to be exchanged or replaced.

SUMMARY OF THE INVENTION

Therefore, it is an object of the present invention to provide a medication adherence management that provides a simple construction, is suited for versatile application and is easy to use by patients and caregivers as well as by medical professionals in order to overcome the aforementioned drawbacks of prior art systems, particularly those drawbacks relating to the need to transfer medication from its initial packaging to the system, due to the detection means, and due to limited adaptiveness to different containers.

The aforementioned object is solved by a medication adherence management system as described herein.

According to one aspect of the present invention, the medication adherence management system comprises a holding apparatus for a medicament container. The holding apparatus comprises a receptacle for holding or connecting to the medicament container, a detector device for wirelessly recognizing an opening and closing of the medicament container in the receptacle, and a data processing device for processing data of said detector device to register a medication activity when a medicament container is opened and closed.

The term "holding apparatus" preferably means an apparatus which can be releasably connected with the medicament container or which can releasably hold or receive the medicament container. In particular, the receptacle of the holding apparatus can be or can form a cavity, opening or the like for receiving or connecting with the medicament container, at least in part.

Preferably, the term "medication adherence" means the "adherence" of a patient to a medication plan, i.e., the extent to which a patient acts in accordance with the prescribed interval and dose of a dosing regimen, as well as the "persistence" of the patient, i.e., the duration of time from initiation to discontinuation of therapy.

According to another aspect of the present invention which may be realized independently, the detector device is adapted for weighing the medicament container and the data processing device registers a medication activity when the medicament container loses weight.

The proposed solutions allow for the immediate use of a commercially available medicament container, such as a common pill bottle or a cardboard package often containing a number of single doses on a blister. The access to the medicament container can be directly monitored without the need for an intermediate dispensing of the medicine from the bulk medicament container the medicine was delivered in into a special medicament container for use with the monitoring system. Thus the preparation of the system is greatly accelerated, since the preparation procedure is reduced to basically combining the bulk medicament container the medicine was acquired in with the holding apparatus.

According to a further aspect of the present invention, a method for medication adherence management is suggested, wherein a medicament container containing a plurality of doses of a medicament is held by a holding apparatus, wherein a detector device of said holding apparatus remotely or wirelessly detects an opening and closing of the medicament container and/or detects any weight changes of the medicament container, and wherein a data processing device registers a medication activity each time when the medicament container is opened and closed and/or each time the medicament container loses weight, preferably by at least an amount of the weight of one dose. Thus, similar advantages can be achieved as described above.

Preferably, the term "medicament" generally relates to medical resources for the treatment of a patient. Its meaning is therefore not limited to medicine that is to be ingested by the patient, but also includes doses of medicament for injection and/or inhalation as well as additional aids that are needed for the application of a treatment, such as syringes, surgical needles or the like.

Preferably, the term "medicament container" relates to a packaging containing multiple preferably pre-metered doses of a medicament. In particular, the packaging can be a bottle, such as a pill bottle, containing multiple tablets, capsules, suppositories or the like. The packaging may be a card box containing a medicament, preferably in the form of tablets, capsules or suppositories, in particular in one or more pocket blisters. Alternatively, the medicament container may optionally contain a liquid, a powder, pre-filled syringes for injections, and/or inhalers, or the like.

The term "medication activity" refers preferably to an event that is probably a removal of a dose of medicament from the medicament container. The medication activity is preferably detected or registered when both an opening and closing of the container is detected and/or when the medicament container loses weight, preferably by an amount of about the weight of one dose or more.

The recognition of the opening and closing of the medicament container is preferably realized remotely and/or wirelessly, i.e. preferably without any electrical contact.

The medicament container or its lid may be provided with detection unit for facilitating the recognition of an opening and closing of the medicament container or its lid. In particular, the holding apparatus or detector device may recognize the detection unit or any movement thereof easily and/or securely when opening and closing the medicament container.

The detection unit can be a simple marker element, e.g., in the form of a geometrical pattern printed or placed on a lid of the medicament container, a magnet or an electronically detectable unit, such as an RFID tag, or a beacon.

Additionally, or alternatively, the detection unit and/or the detector device can comprise or be formed by a sensor, in particular a motion sensor, a proximity sensor, a tilting sensor, a position sensor, force sensor or a weighing sensor. This supports the detection of an opening and closing of the medicament container and/or allows weighting of the medicament container.

Preferably, the detector device is capable of an optical, a tactile, a remote and/or ultrasonic interaction with the medicament container and/or the detection unit of the medicament container. This ensures a reliable operation of the medication adherence management system.

In a preferred embodiment, the detector device can additionally or alternatively be capable of recognizing the type of medicament in the medicament container and/or the amount of a drug in a given dosage form and/or package size. The type of medicament can also include the batch and/or lot number, the date of production and/or the date of expiry. This can be done by reading specific marks on the medicament container, such as the EAN number or a specific barcode or RFID tag, for example.

The data processing device preferably comprises electronic circuitry, particularly a microprocessor. It is preferably capable of performing even complex calculations and operations. This supports a versatile use and user information.

The holding apparatus or data processing device preferably comprises a memory for storing data and/or the occurrence of medication activities.

In this regard it is preferred that the data processing device and/or the detector device is designed to be capable of counting and/or storing the number of activities registered by the detector device and, more preferably, of comparing the actual number of activities with a reference value. That way the system according to the invention can evaluate whether a patient adheres to the medication schedule or deviates from it.

In a preferred embodiment, the data processing device comprises a time base. This allows to timestamp registered activities. If the data processing device comprises a time base and a memory, each activity can be stored in a data set together with the respective time. Additionally, or alternatively, the system can be capable of receiving an external time signal.

The medication adherence management system and/or holding apparatus can further comprise additional sensors or devices for gathering additional information on the system's environment. Among others, this can include a geolocation device, such as a GPS receiver, and/or a temperature sensor. Additionally, or alternatively, the system can be capable of receiving such information from external sources or devices.

In a preferred embodiment, the holding apparatus allows patients, caregiver, healthcare provider or others to read at least part of what is displayed on the medicament container, like the brand name of the medication, while the medicament container is in the receptacle of the holding apparatus.

In a preferred embodiment, the holding apparatus comprises a visualization and/or notification device. This can be a display, an acoustic, optical and/or vibrational indicator. A visualization device or a notification unit can be utilized to output data from the data processing device, such as the number of detected activities, deviance from or adherence to a medication schedule and/or a notification reminding a patient to take his medicament. Additionally, or alternatively, the visualization and/or notification device can be utilized to indicate if the medication adherence management system is operational, e.g., if the medicament container has been inserted correctly into the holding apparatus.

The visualization and/or notification device is preferably controlled by the data processing device. That way the data processing device can initiate a visualization of registered medication activities. Apart from the time or actual number of the last, some or all registered activities, a user can be informed about any difference between the actual number of activities and a reference value, and/or a specific relation of the actual time and a reference time, e.g., the time a patient is overdue to take his medicine.

Preferably, the holding apparatus or data processing device can comprise a communication device, which is preferably associated with the data processing device, for communicating with an external device and/or a network. Via the communication device, data can be sent to and/or received from a remote location and can be processed and/or evaluated remotely and/or locally. For easy connectivity, the communication device can comprise a preferably wireless digital data interface. Common types of interfaces that are in widespread application are particularly preferred. Among others, these are, for example, a serial port, a USB port, an Ethernet port, a WLAN module, a GSM module and/or a Bluetooth module.

The data processing device is preferably capable of transmitting data via the communication device, preferably to a receiver, particularly a server or a data center in a remote location. Additionally, or alternatively, to the outbound transmission of data from the data processing device, the data processing device can particularly also be remote-controllable via the communication device. For example, this allows a medical expert to monitor the adherence of a patient to the medication schedule and notify the patient in case he deviates from the schedule. In particular, inbound communication may allow or control setting and/or changing of alert times and/or modes for reminding the patient and/or may control software updates.

Alternatively, or additionally, the holding apparatus or data processing device or communication device can be controlled or programmed by a smartphone, laptop, computer or the like via a wireless or cable connection.

It is also possible that the system, holding apparatus or data processing device is adapted to send data, such as information about medication activities, any notifications or the like, to a communication device, such as a smartphone, tablet, laptop, computer, smart watch or the like of the user, caregiver, healthcare professional, service center, etc.

Preferably, an activity information includes an indication of a medication activity and/or related point of time, any division from desired or required schedule, statistical information about the activities, any reminders or notifications, e.g., regarding overdue medication activity, overdue closing of the medicament container, expected change or refill of the medicament container, expected number of doses already consumed or still contained in the medicament container, the current time, the time of the next dose is to be taken, and/or the like.

For control of the medication adherence management system, the holding apparatus can comprise a user interface, preferably a control panel, allowing to control the medication adherence management system, particularly the data processing device of the system, by user input. The local control of the system can be realized additionally or alternatively to a remote-control.

While the system can be very well operated in a stationery mode, it is preferably also operational independently from an external power supply. This allows the patient to carry the system around. Since the system can be present in the patient's vicinity at most times, the probability of forgetting the intake of the medicine is highly decreased.

The aforementioned mobility of the system can be achieved or supported by a preferably rechargeable battery. The battery can be connected to the holding apparatus or, preferably, be enclosed in the holding apparatus for increased integrity.

The holding apparatus typically comprises a housing that can contain several components of the medication adherence management system, such as the data processing device and/or the detector device. Preferably, the receptacle is formed at least partially by the housing of the device. This way the holding apparatus is simple and compact in its design and easy to use for a patient.

By designing the housing such that the medicament container is at least partially visible, when it is placed in its operational position, third parties, such as a medical attendant, can easily check what medicament is loaded into the system and what is the filling level of the medicament container. In order to clear the view at the medicament container the holding apparatus can particularly comprise a window or recess in the housing and/or the holding apparatus or housing can be at least partially transparent.

The housing can be made of a polymer material or can comprise a polymer material. This increases the mechanical resilience and the robustness against dirt, water and/or chemical agents.

Preferably, the housing is made of a soft touch material and/or its surface is coated with a soft touch material. This allows a user or patient to conveniently grip the system or holding apparatus, e.g., for a medication activity.

The holding apparatus, particularly the housing, can comprise a hand strap or a fixation clip. This reduces the risk for the patient to drop the system.

In a preferred embodiment the housing of the holding apparatus is at least partially sealed, preferably substantially watertight and/or gastight. This qualifies the system for a use also in wet surroundings, such as a bathroom, a kitchen or outside of a building. Further, the inner components of the holding apparatus are then protected against body fluids or any other contamination.

Preferably, the receptacle at least substantially resembles the outer shape of the medicament container. The medicament container can then fit into the receptacle with substantially no clearance between the receptacle and the medicament container. This supports a tight fit of the medicament container and prevents inadvertent movement of the container in the receptacle. Further, the risk of an unwanted disconnection of the medicament container from the holding apparatus and even losing the medicament container is highly decreased.

A tight fit of the medicament container in the receptacle can be ensured by means of a securing element preventing the medicament container to escape from a fixed position in relation to the holding apparatus.

In order to keep the patient information leaflet with the medicament, the holding apparatus can comprise a compartment or a pocket to receive the leaflet. The compartment or pocket can be provided inside the receptacle to keep the leaflet together with the medicament container. It is further possible to form or attach a separate pocket on the outside of the holding apparatus, particularly the housing.

The holding apparatus, in particular the housing, can comprise a lid and/or a cover associated with the receptacle. That way the medicament container can be additionally covered and therefore protected against environmental influences or against unauthorized access to the medicine.

For monitoring reasons, the lid and/or the cover can also comprise detection means, such as a lid switch, for example. The detection means of the lid or the cover can be provided additionally or can function as the detector device of the medication adherence management system.

According to another aspect of the present invention which may be realized independently, the holding apparatus of the medication adherence management system or a housing thereof comprises multiple modular elements. The modular elements are preferably exchangeable such that the medication adherence management system or holding apparatus is adaptable to different medication adherence management needs. For example, different exchangeable modular elements could comprise different detector devices, communication devices, power supplies or the like. In particular, different exchangeable modular elements can correspond to different sizes and/or shapes of medicament containers such that the holding apparatus is adaptable to fit different medicament containers as required.

According to another aspect of the present invention which may be realized independently, the holding apparatus is designed to hold or to be connected to the medicament container at its shoulder, neck or a tapered part which is preferably located between lid and reservoir of the medicament container.

Preferably, the medication adherence management system is adapted to hold or support the medicament container at its bottom and/or from below while also holding or being connected with the medicament container at its shoulder, neck or tapered part.

Alternatively, the medication adherence management system is adapted so that the medicament container hangs in the holding apparatus, preferably while being held at its shoulder, neck or a tapered part. Since the medicament container is held at its shoulder, neck or a tapered part, the reservoir can hang freely in the receptacle of the holding apparatus. In particular, the receptacle does not need to resemble the medicament container or reservoir.

Alternatively, the holding apparatus can be adapted to hang on the medicament container, in particular on or at a shoulder, neck or tapered part of the medicament container.

Preferably, the receptacle is designed to receive medicament containers of different shapes and/or sizes. This allows to use the same holding apparatus for different medicament containers, in particular without the need to exchange any modular parts.

According to another aspect of the present invention which can also be realized independently, the holding apparatus comprises at least two elements which are moveable relative to each other for holding and/or fixing the medicament container. In particular, the medication adherence management system can be in two different states, an inoperable state and an operating state.

In the inoperable state, the elements are preferably positioned with respect to each other such that a medicament container can be easily inserted into the holding apparatus. Moving the elements with respect to each other after the medicament container has been inserted brings the medication adherence management system into its operating state where the medicament container is securely hold and/or fixed in the holding apparatus.

According to another aspect of the present invention which can also be realized independently, the holding apparatus comprises at least two elements which are moveable relative to each other for adapting to medicament containers of different size and/or different shape. In particular, the elements may be moveable such that the holding apparatus is height-adjustable and thus can hold or receive medicament containers of a different height. The moveable elements are in particular releasably lockable against movement relative to each other, particularly preferably releasably lockable in different positions with respect to each other, the different positions corresponding to medicament containers of different size and/or shape, in particular of a different height.

According to another aspect of the present invention which may be realized independently, the medication adherence management system or holding apparatus comprises a cap which is adapted to receive a lid of the medicament container and to connect with it in a force-fit, form-fit and/or snap-fit manner. The cap preferably can be clipped or plugged onto the lid from the top. In particular, the cap engages with the lid in such a way that both of them form a unit which is removable from and attachable to the reservoir of the medicament container. The cap can serve as a lid protection and can comprise further detection means. The medicament container can be opened while held in the holding apparatus by removing the cap, preferably by unscrewing, in particular together with the lid of the medicament container and/or without the need to first remove the cap and then subsequently the lid.

By providing such a cap, the medicament container can be received completely in the holding apparatus, in particular without any parts like the lid sticking out of the holding apparatus. This allows to protect the medicament container and/or medicament from environmental influences and/or to seal the medicament container from unauthorized access. However, with the cap and lid being removable together, it is still easy to open the medicament container and take out the medicament, in particular while the medicament container is held in the holding apparatus.

The above aspects of the present invention and the further aspects described below can be realized independently from each other, and in any combination.

Further advantages, features, characteristics and aspects of the present invention will become apparent from the following description of preferred embodiments with reference to the accompanying drawings.

DETAILED DESCRIPTION OF THE INVENTION

Figure 1:
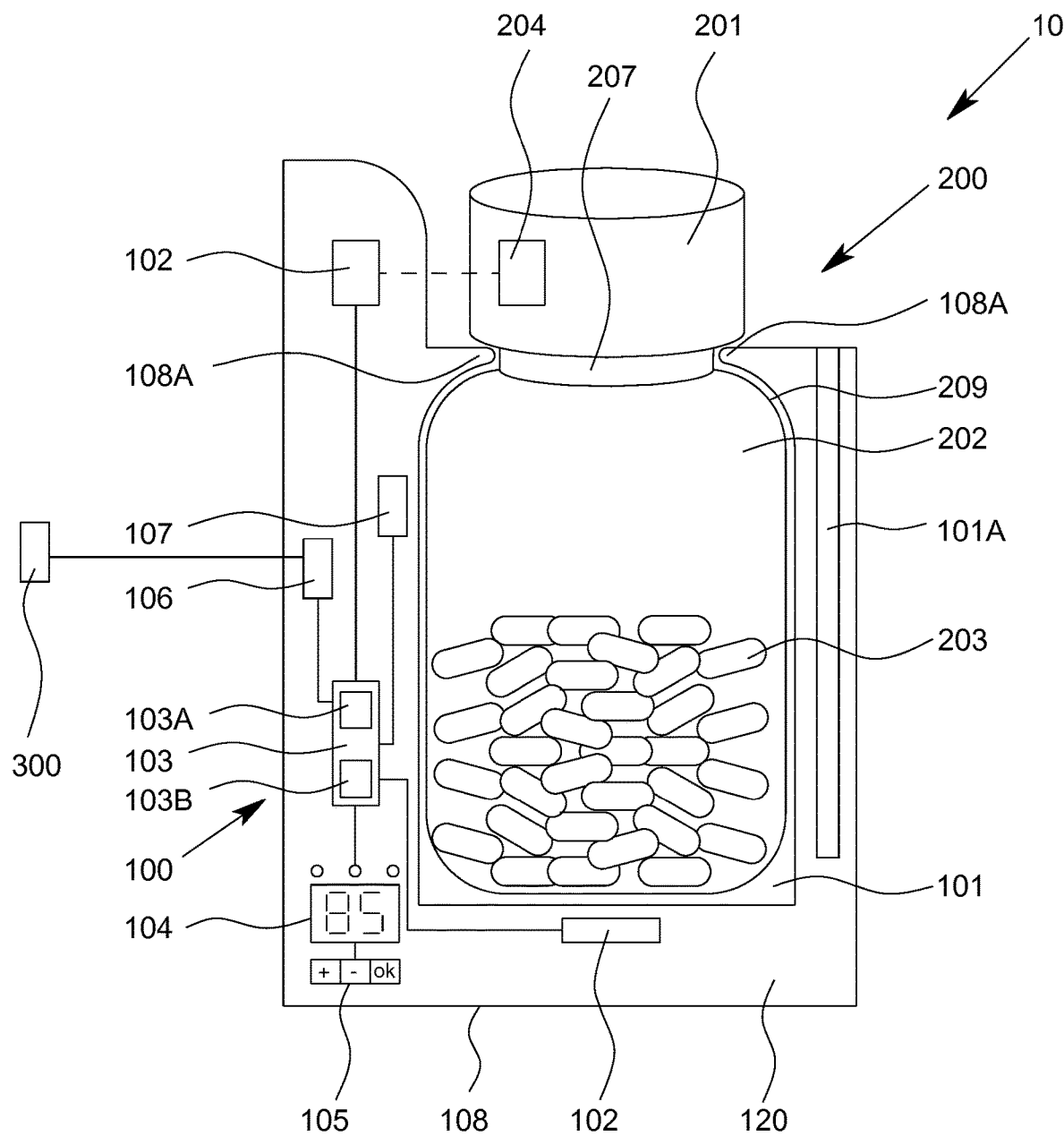
FIG. 1 is a schematic sectional side view of a first embodiment of the medication adherence management system.

In the figures, the same reference numerals are used for identical or similar parts, resulting preferably in corresponding or comparable properties and advantages, even if the associated description is not repeated.

A preferred embodiment of a medication adherence management system 10 is shown in FIG. 1. The system 10 comprises a holding apparatus 100 with a receptacle 101 for holding or connecting to a medicament container 200.

The holding apparatus 100 or receptacle 101 is suited for the use of a commercially available common type bulk medicament container 200. In the example, the medicament container 200 has the form of a pill bottle, which is widely available, for example, in drugstores or pharmacy shops or pre-filled by pharma companies. Preferably, to the invention the shape of the medicament container 200 is not limited to the depicted bottle form. Other shapes, sizes and kinds of medicament containers 200 can equally be used with the holding apparatus 100.

The holding apparatus 100 can either be adapted in each case to different medicament containers 200 or can be designed for a universal fit of different shapes of medicament containers 200. Alternatively, or additionally the holding apparatus 100 or receptacle 101 can comprise one or more exchangeable parts or inserts that can be changed to adapt the holding apparatus 100 or receptacle 101 to different kinds or sizes of medicament containers 200.

The medicament container 200 is placed in and/or held by the receptacle 101 of the holding apparatus 100.

Preferably, the receptacle 101 opens upwards and/or receives a lower part of the medicament container 200.

In particular, the receptacle 101 forms or comprises an opening which receives the medicament container 200.

In the illustrated embodiment, the medicament container 200 may extend outwards or above the holding apparatus 100 or receptacle 101, in particular such that a lid 201 of the medicament container 200 is accessible and/or can be opened and closed, while the medicament container 200 is received in or held by the receptacle 101.

However, the medicament container 200 can also be inserted completely or received completely in the receptacle 101. Even then, the system 10 and/or the holding apparatus 100 and the medicament container 200 are adapted such that the medicament container 200 or its lid 201 can be opened and closed while the medicament container 200 is held by the holding apparatus 100 or receptacle 101.

The operating position of the medication adherence management system 10 is preferably such that the medicament container 200 is held upright in the holding apparatus 100, in particular with an opening of the medicament container 200 and/or lid 201 or another cover of the medicament container 200 being located at the top of the medicament container 200 and/or medication adherence management system 10.

The holding apparatus 100 preferably comprises a bottom or base 120 which is adapted to rest on a horizontal plane, such as a table, when the medication adherence management system 10 is in the preferred operating position. In particular, the bottom or base 120 is located opposite of an opening, lid 201 or other cover of the medicament container 200.

The above described operating position defines a preferred orientation of the medication adherence management system 10. In particular, terms and expressions used in the following description, which depend on the orientation of the medication adherence management system 10, such as "horizontal", "vertical", "above" or "below", refer to this preferred orientation, even if not mentioned explicitly.

However, the medication adherence management system 10 does not need to be in the preferred operating position to be functional, for example, the medication adherence management system 10 could also lie on one of its vertical sides or be in any other orientation, for example, when carried in a bag or pocket.

Preferably, the holding apparatus 100 comprises a detector device 102 and/or a data processing device 103 for wirelessly or remotely recognizing an opening and closing of the medicament container 200 and/or for weighing the medicament container 200 and/or for registering a medication activity, in particular each time when the medicament container 200 or its lid 201 has been opened and closed and/or each time the weight of the medicament container 200 has changed or decreased, preferably at least by an amount about the weight one dose of the medicament 203 contained in a reservoir 202 formed by the medicament container 200.

The detector device 102 and the data processing device 103 can be formed by separate devices. Alternatively, the data processing device 103 can comprise or form the detector device 102 or vice versa.

Preferably, the holding apparatus 100 is designed such it can be fastened to a vertical and/or horizontal plane. For this purpose, the holding apparatus 100 or its housing 108 may be provided a fastening means, such as a self-adhesive tape, a nail, a screw, an aperture, or the like. Preferably, the medication adherence management system 10 comprises the medicament container 200 or forms a kit of the holding apparatus 100 in combination with multiple medicament containers 200.s When operating, the medication adherence management system 10 or holding apparatus 100 monitors any opening and closing of the medicament container 200. In particular, the detector device 102 recognizes the opening and closing of the lid 201 of the medicament container 200. This is necessary to access the reservoir 202 of the medicament container 200 in order to remove a dose of the medicament 203. Therefore, it can be concluded that, if an opening and closing is recognized, at least one dose of the medicament 203 has been removed from the medicament container 200 and taken by a patient. This assumed removal of medicament 203 is called medication activity and registered each time when it is recognized or detected that the medicament container 200 is opened and closed.

It is pointed out that the recognition or detection of both, opening and closing, of the container 200 or its lid 201 is secure and/or ensures that the next opening can be securely detected. However, theoretically and according to the present invention, it is also possible, to detect only an opening of the container 200 and register this already as medication activity.

Preferably, the opening and the closing is recognized or detected and only when both occur, a medication activity is registered, but related to the opening. Namely, it can happen that a user forgets to close the medicament container 200 (directly) after removal of the medicament 203 or within a certain time limit. Then, the holding apparatus 100 or data processing device 103 can remind the user. Further, the medication activity can always be related to the point of time of opening the medicament container 200 in order to prevent a probably false time relation, which could occur when relating the medication activity to the point of time of closing the medicament container 200.

Preferably, a medication activity is only registered when a closing has been registered within a specified period of time after an opening has been detected.

In particular, a medication activity is not registered when the opening time is too short for removing the medicament 203, e.g., less than a few seconds.

If the medicament container 200 has remained open for too long, no reliable conclusion can be made if a medicament 203 has been removed or not. Preferably, in this case, a possible medication activity is either not registered at all, or still registered and related to the opening time as described above, but is also assigned with an error or a warning that the medicament container 200 has been opened for too long, particularly preferably together with the time the medicament container 200 has remained opened.

In particular, after detection of a closing of the medicament container 200, the system 10 can go into an inactive or stand-by mode, preferably automatically. The system 10 preferably goes into an active or detection mode only when a medication activity is due, preferably automatically, and/or when the system 10 is accessed directly or remotely by a user or patient.

The detection of the opening and closing by means of the detector device 102 can be carried out directly. In this case the detector device 102 can recognize, for example, the motion of the lid 201 of the medicament container 200 relative to the holding apparatus 100. This can be done on a visual basis, e.g., by means of a camera, and/or by detecting a changing proximity, position or inclination of the lid 201 to the detector device 102.

Preferably, the medicament container 200 comprises a detection unit 204 to support or allow the detection of opening and closing by the detector device 102. The detection unit 204 can be integrated into the medicament container 200 or attached to medicament container 200, for example, printed or placed on the medicament container 200 or lid 201. Alternatively, or additionally, the detection unit 204 can be provided separately and attached to the medicament container 200 or lid 201 at a later time, e.g., when placing the container 200 in the receptacle 101.

Particularly preferably, the detection unit 204 is attached to the medicament container 200 at the top or a peripheral side, in particular at the top or peripheral side of a lid 201.

The detection unit 204 can comprise or be formed by a passive detectable element, particularly a reference pattern, which can be visually detected by the detector device 102, or a magnet and/or an electronic reference element, such as an RFID tag. Such a detection unit 204 can be preferably wirelessly detected by the detector device 102, which is indicated by a dashed line in FIG. 1.

The detection unit 204 of the medicament container 200 can additionally or alternatively comprise a sensor. That way, for example, the actual opening state or position of the lid 201 of the medicament container 200 can be measured.

In particular, a sensor of the detection unit 204 can generate a signal that can be remotely and wirelessly read by the detector device 102. A tilting of the lid 201, for example, due to an opening activity will then be recognized by a tilting sensor, which is detected by the detector device 102.

Additionally, or alternatively, sensors for detecting a tilting, lifting and/or movement of the system 10, holding apparatus 100 and/or medicament container 200 can be provided for detecting a medication activity and/or for bringing the system 10 from an inactive or stand-by mode into an active or detection mode.

Detecting a tilting of the system 10, holding apparatus 100 and/or medicament container 200 can also be utilized to generate a warning, in particular via a visualization and/or notification device 104, if the system 10, holding apparatus 100 and/or medicament container 200 is not in the correct position for a medication activity.

For the visual detection of an opening and closing of the medicament container 200 the holding apparatus 100 or detector device 102 can comprise an optical sensor, such as a photodiode, a CCD-camera or the like. For example, by means of a camera the lid 201 of the medicament container 200 can be imaged, whereby a change in the image indicates an opening or closing.

In case of an optical reference element, such as a reference pattern in the function of a detection unit 204, it can be recognized by the holding apparatus 100 or data processing device 103 and compared with a start pattern. Deviations in shape of the reference pattern imaged by the detector device 102 can then be detected and evaluated in order to register a motion of the lid 201 of the medicament container 200 indicating an opening or closing.

Additionally, or alternatively the detection unit 204 can comprise or be formed by a magnet that interacts with the detector device 102 which, in this case, preferably comprises a magnetic switch, magnetic sensor or the like. By opening the lid 201 the magnet of the detection unit 204 may be moved closer towards or further away from the detector device 102, thereby activating the magnet switch of the detector device 102. This can generate a signal that can be read by the data processing device 103.

If the detection unit 204 of the medicament container 200 comprises an electrically detectable element such as an RFID tag, the working principle is similar to the one described for the case of a magnet. A movement of the lid 201 that carries the detection unit 204 with the RFID tag causes the detection unit 204 to change its position relative to the detector device 102 of the holding apparatus 100. The tag can then be remotely read by the detector device 102, which sends an according signal to the data processing device 103.

Alternatively, or additionally, the detection unit 204 or RFID tag on one hand and the detector device 102 on the other hand may form a proximity sensor or proximity switch so that presence and/or opening and/or closing of the medicament container 200 can be detected.

The detection unit 204 or RFID tag that is associated with the medicament container 200 can carry information on the medicament 204 and/or medication plan, such as the name of the medicament 204, the packaging size and/or the dosage, which, in particular, can be read when the medicament container 200 is placed in the receptacle 101 or prior to insertion.

Data on the detection unit 204 or the RFID chip can be interpreted by the data processing device 103 and, in particular, compared with a preset or prescribed medicament or dose, preferably depending on a specific or electronic medication plan.

Apart from the aforementioned examples, the holding apparatus 100 or detector device 102 can alternatively or additionally be capable of an optical, a tactile, a remote and/or ultrasonic interaction with the detection unit 204 and/or at least partially with the medicament container 200 or its lid 201.

Alternatively, or additionally, the holding apparatus 100 or detector device 102 can be adapted to weigh the medicament container 200 and register a medication activity each time when the medicament container 200 loses weight of an amount of about one dose of the medicament 204 or more. For this purpose, the holding apparatus 100 or detector device 102 may comprise a scale or weighing sensor, e.g., a piezo element or strain gauge.

Further, the holding apparatus 100 or detector device 102 can comprise several detection means of the aforementioned kind that complementarily cooperate to detect an opening and closing of the medicament container 200. This can be preferably achieved by redundantly providing detection means based on different detection principles. Thus, it can either be ensured that an opening and closing activity is detected at all or false positive detection results can be eliminated.

It has noted that the detector device 102 is preferably arranged adjacent to the lid 201 of the medicament container 200 and/or adjacent to an opening of the receptacle 101 for inserting the medicament container 200 and/or accessing the lid 201 of the medicament container 200.

The detector device 102 can generally be located in different places relative to the medicament container 200. Alternatively, or additionally, to an arrangement adjacent to the lid 201 of the medicament container 200 or opening of the receptacle 101, the detector device 102 can be located at the bottom or any side of the receptacle 101 or be associated with the bottom or any side of the medicament container 200.

Additionally, or alternatively, the detector device 102 can be capable of recognizing the medicament 203 and/or the medicament container 200 loaded into the system 10, i.e., placed in the receptacle 101. This can be realized by reading a barcode and/or the EAN number on the medicament container 200, for example. However, any other way of recognition, e.g., optical character recognition (OCR), RFID technology etc., is also possible.

Preferably, the signal generated by the detector device 102 is sent to or read by the data processing device 103, respectively.

The data processing device 103 preferably comprises electronic circuitry, particularly a microprocessor. It is preferred, that the data processing device 103 can carry out complex operations and/or calculations, such as the comparison of different values, to read and/or output values and to perform calculations with them.

In particular, the data processing device 103 and/or the detector device 102 is/are preferably capable of determining, counting and/or storing the number and/or point of time of registered medication activities, especially of opening and closing of the medicament container 200, and preferably of comparing the data or an actual number of activities with a reference value or desired schedule.

The holding apparatus 100 or the data processing device 103 can comprise a memory 103A for storing data transferred to or generated by the data processing device 103. The memory 103A can be integrated in the data processing device 103 or can be arranged separately inside or outside the holding apparatus 100.

It is highly preferred that the holding apparatus 100 or data processing device 103 further comprises a time base 103B. This allows to timestamp the registered events or activities. If a medication activity is detected, the time and/or date of the event can be stored and/or evaluated. The evaluation of the time and/or date of registered activity can include the comparison of the actual time and/or date of the event with a stored reference or desired time and/or date.

Further, the medication adherence management system 10, in particular the holding apparatus 100, can comprise means for gathering information on the environmental situation and/or the location of the system 10. This can include a geolocation chip, such as a GPS receiver, and/or a temperature sensor, a humidity sensor, a pressure sensor or the like.

Additionally, or alternatively, the holding apparatus 100 or data processing device 103 can be capable of receiving, storing and/or evaluating external signals, in particular a time and/or date. These signals can be received, for example, via the internet or another network, radio transmission, an external device 300 or the like, preferably wirelessly.

Preferably, the holding apparatus 100 or the data processing device 103 can store, display, output and/or communicate the activity information, which may include an indication of a medication activity and related point of time, any division from desired or required schedule, statistical information about the activities, any reminders or notifications, e.g., regarding overdue medication activity, overdue closing of the medicament container 200, expected change or refill of the medicament container 200, expected number of doses already consumed or still contained in the medicament container 200, the current time, the time of the next dose is to be taken, or the like.

Preferably, the holding apparatus 100 comprises a visualization and/or notification device 104. For example, the activity information can be displayed by the visualization device 104. This way the patient can be informed e.g., about the next time for taking a dose of medicament 203 or can be reminded of taking his medicine, if he is overdue a certain period of time.

The visualization device 104 and/or activity information can be used for providing the patient with data such as the number of counted medicine intakes, the time since the last change of the medicament container 200, the time since the last medicament intake, the time until scheduled intake of medicine, the battery charge or the like.

The visualization and/or notification device 104 can comprise a display 104A, an acoustic, an optical and/or a vibrational indicator. There is also the possibility to provide a combination of different notification units or visualization devices 104.

The medication adherence management system 10 can alternatively or additionally comprise a user interface 105, preferably a control panel, such as one or more buttons, a touch screen or the like, allowing to control the system 10, particularly the data processing device 103, by user input. The user interface 105 can be realized as part of the holding apparatus 100 or, alternatively or additionally, in the form of an external device 300 such as remote control or as a software based application for a computer or a mobile device like a smartphone or tablet computer.

The user interface 105 can be used to set reference values or a schedule, reset the system 10 after change of the medicament container 200, select values stored in the memory 103A to display or otherwise program the data processing device 103.

However, the medication adherence management system 10 or holding apparatus 100 is preferably adapted to automatically recognize a change of the medicament container 200 and to reset the system 10 or certain values stored in the memory 103A, like remaining number of pills, accordingly.

Further, the holding apparatus 100, visualization device 104 and/or user interface 105 can allow for more advanced communication with the patient. For example, the patient can answer questions presented by the system 10 or a person in a remote location or the patient can phone or text or video chat with a person, such as a nurse, a physician or another medical expert, engaging in telemedical applications.

The medication adherence management system 10 and/or the holding apparatus 100 can further comprise a communication device 106 for communicating with an external device 300 and/or a network.

The communication device 106 can comprise a preferably wireless digital data interface, particularly a serial port, a USB port, an ethernet port, a WLAN module, a GSM module and/or a BLUETOOTH® module. Such widespread types of interfaces ensure an easy connectivity and integration in existing networks.

The data processing device 103 can preferably use the communication device 106 to communicate with a receiver which may be an external device 300 in a remote location. The data processing device 103 is then preferably designed to be capable of transmitting, i.e. sending and/or receiving, data via the communication device 106. The receiver or the external device 300 can in particular be a mobile device, smartphone, tablet, computer, server or data center.

In a preferred embodiment the data processing device 103 is remote-controllable via user interface 105 and/or the communication device 106. This can include the possibility to configure settings of the medication adherence management system 10 via the user interface 105 or communication device 106, e.g., in the form of a software application running on a device connected to the system 10. A remote control of the medication adherence management system 10 can additionally or alternatively be realized from a distant location connected via an internet connection, particularly over a mobile network.

Preferably, the holding apparatus 100 or the system 10 can be controlled, programmed, activated and/or deactivated by the external device 300. The external device 300 can connect or communicate with the holding apparatus 100 or the system 10 via the user interface 105 and/or communication device 106.

Preferably, the external device 300 can read, display and/or process the activity information provided by the holding apparatus 100 or the system 10, particularly the data processing device 103.

For increased mobility the medication adherence management system 10, particularly the holding apparatus 100, can be operationally independent from an external power supply. Therefore, the holding apparatus 100 can comprise a preferably chargeable battery 107 or such battery 107 can be associated with the holding apparatus 100. The battery 107 can be arranged outside of the holding apparatus 100, but is preferably integrated into the holding apparatus 100.

The battery 107 can be designed to be easily exchangeable after drainage. Additionally, or alternatively, it is preferred that the battery 107 is rechargeable. Charging of the battery 107 can be carried out preferably via a widely used USB port, preferably a Mini- or Micro-USB port. Advantageously, a common USB port is shared for the functions of charging the battery 107 and communication with the system 10.

By sending data from the data processing device 103, for example, to a data center via the communication device 106 it is possible, for example, for a medical expert to check and evaluate the status of the system 10, data and activity information and preferably remotely give advice for the patient by sending a signal to the local system 10. The visualization device 104 or a connected device, such as a smartphone, can then inform the patient on actions to undertake.

Further, it can be possible for a medical expert to program the medication adherence management system 10 and/or update its software from the distance.

As depicted in FIG. 1, the holding apparatus 100 preferably comprises a housing 108 that preferably contains the different components of the system 10. In the preferred embodiment, the receptacle 101 is formed by the housing 108 of the holding apparatus 100.

The holding apparatus 100, in particular the housing 108, can further comprise explanatory imprints and/or stickers.

For the sake of increased resilience of the holding apparatus 100 regarding mechanical stress, temperature, humidity and/or against chemical agents the housing 108 is preferably made of or comprises a robust material such as a polymer. It is also possible to use a composite material consisting of different materials, such as different polymers and/or metal, for example. Particularly preferably, the housing 108 is made of a soft touch material and/or is coated with a soft touch material, allowing to grip the system 10 or holding apparatus 100 by a patient or user.

The housing 108 can further be designed to be at least partially sealed, preferably, substantially watertight and/or gastight. That way the holding apparatus 100 and therefore the medication adherence management system 10 can be suited for a use in wet surroundings, e.g., in a bathroom, a kitchen or outside of a building being exposed to high humidity or even spray water.

Preferably, the holding apparatus 100 or receptacle 101 is formed or adapted such that the associated medicament container 200 can be held by form-fit or force-fit.

The receptacle 101 can have a cup-like form.

Preferably, the receptacle 101 encompasses the sides and the bottom of the medicament container 200 and holds the medicament container 200 such that the lid 201 is accessible.

Preferably, the receptacle 101 at least substantially resembles the outer shape of the medicament container 200, as shown in FIG. 1.

Preferably, the holding apparatus 100 or housing 108 comprises one or more securing elements 108A for securing or holding the medicament container 200 in the receptacle 101. The elements 108A can comprise e.g., the form of protrusions engaging in a tapered part of the depicted pill bottle. The securing elements 108A prevent the medicament container 200 to escape from a fixed position, particularly in the receptacle 101.

The tapered part of the medicament container 200 is in particular formed by a neck 207 and/or shoulder 209 of the medicament container 200, as for example shown in FIG. 1.

Optionally, the one or more securing elements 108A can be flexible or moveable or pivotable.

Alternatively, is also possible that the housing 108 or at least a part thereof is flexible so that the receptacle 101 or the securing elements 108A can be flexed apart from each other so that the medicament container 200 can be removed or inserted.

In case of differently shaped medicament containers 200 the securing elements 108A of the holding apparatus 100 can be designed accordingly, i.e. adapted to the outer shape of the medicament container 200.

The holding apparatus 100 can form a stand-alone device which can be placed, e.g., on a table, side board or the like.

Additionally, or alternatively, the holding apparatus 100 can comprise a hand strap or a fixation clip, which is not shown in the drawings, in order to support the mobility of the medication adherence management system 10. This also decreases the risk of dropping the holding apparatus 100.

The holding apparatus 100 or housing 108 may comprise a separate compartment 101A or a pocket for storing a patient information leaflet related to the medicament 203 in the medicament container 200. As depicted in the drawings, the compartment 101A or pocket can be located within the receptacle 101 together with the medicament container 200 or be attached to or formed by the housing 108 on the outside of the holding apparatus 100.

Preferably, the holding apparatus 100, in particular the housing 108, is designed such that the medicament container 200 is at least partially visible when in its operational position, i.e. in the receptacle 101. The housing 108 can comprise a window exposing parts of the medicament container 200 or even comprise a recess in the housing 108, hence not fully covering the medicament container 200. Thus, labels or the like on the medicament container 200 can be read without removing the medicament container 200 from the receptacle 101. Also, the filling level of the medicament container 200 could easily be checked without the need to disassemble the medication adherence management system 10. It has to be noted that a window or a recess of the aforementioned kind is not visible in the sectional views of the drawings. Additionally, or alternatively, the holding apparatus 100 and/or housing 108 can be at least partially transparent.

In the following, further embodiments of the present invention will be described, in particular based on FIGS. 2 to 15, wherein only relevant differences or additional aspects will be emphasized. The previous explanations apply preferably in addition and lead to similar features and advantages even if not repeated.

Figure 2:
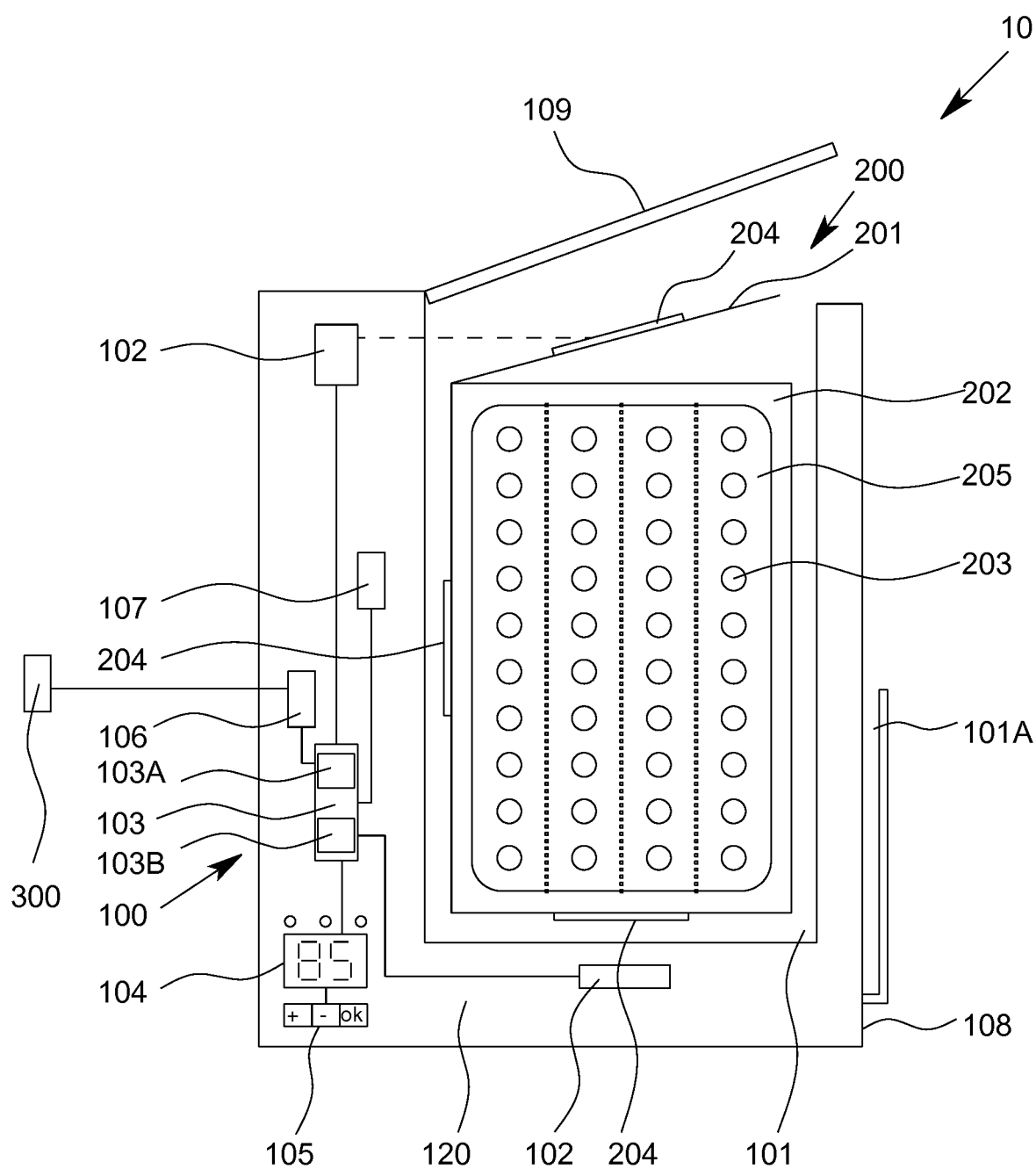
FIG. 2 is a schematic sectional side view of a second embodiment of the medication adherence management system.

FIG. 2 shows a second embodiment of the medication adherence management system 10 in a schematic section similar to FIG. 1. In the second embodiment, in particular a different kind of medicament container 200 is shown.

Preferably, the medicament container 200 is a cardbox package.

Preferably, the medicament 203 is delivered or received in form of single doses in a blister 205, instead of a pill bottle as depicted in FIG. 1. One or more blisters 205 are placed within the reservoir 202 of the medicament container 200.

The medicament container 200 can comprise one or more blisters 205. Each blister 205 can comprise one or more pockets with a medicament dose.

The cardboard package comprises at least one lid 201 that has to be opened in order to access a blister 205 and the medicament 203.

The opening and closing of the medicament container 200 can be detected by the detector device 102 also in case of the cardboard package. However, it can be impractical to only access the medicament 203 from outside the holding apparatus 100 while the medicament container 200 is seated in the receptacle 101. Thus, the holding apparatus 100 can be designed such that an opening and closing or, more generally, access to the medicament container 200 or medicament 203 can be detected when the patient removes the medicament container 200 from the receptacle 101 in order to take a single dose of the medicament 203 from the blister 205 inside the medicament container 200. Therefore, removal of the medicament container 200 and reinsertion can be recognized and registered as medication activity. For this purpose, the receptacle 101 can be shaped or sized such that it supports the easy removal of the medicament container 200 from the holding apparatus 100.

In the second embodiment, the medicament container 200 can comprise one detection unit 204 at different location or several detection units 204 that ensure optimized detectability by the detector device 102. An opening and closing activity of the medicament container 200 can be detected as well as the removal of the medicament container 200 from the receptacle 101. Preferably, the detector device 102 is capable of detecting the passing by of one detection unit 204. This can be carried out, for example, by detecting a passing RFID tag, magnet or visually detectable reference pattern.

Particularly, in case of a medicament container 200 in the form of a cardbox package, it can be suitable to provide two or more detection units 204. For example, if the cardbox package is openable on both ends, each end can be equipped with a separate detection unit 204. Then, the user is not required to orient the medicament container 200 in a specific manner when inserting or reinserting it into the receptacle 101.

The detector device 102 preferably detects the outbound motion of the medicament container 200 from the receptacle 101 as well as the returning of the medicament container 200 to the holding apparatus 100. Thus, instead of or additionally to an opening and a closing activity moreover a removing and returning activity is registered as medication activity, i.e., medicine intake by the patient.

Optionally, the holding apparatus 100 comprises a cover 109 that can be pivotably arranged at the entrance of the receptacle 101.

Preferably the cover 109 covers the receptacle 101 in a tight manner, particularly protecting the medicament container 200 and the medicament 203 from environmental influences such as dirt and/or humidity.

Additionally, or alternatively, the cover 109 can serve as a child protection granting only authorized persons, such as the patient or a medical attendant, access to the medicament container 200 in the receptacle 101.

In particular, a user can be authorized for access to the medicament container via the user interface 105. For example, a personal unlocking code can be entered via the user interface 105.

The cover 109 also provides the possibility to grant access to the medicament container 200 only at specific times. For this purpose the data processing device 103 can generate an unlock signal to unlock a locking mechanism for the cover 109. Thus, an inadvertent overdose due to a too frequent intake of the medicament 203 can be avoided. Especially patients suffering from amnesia are, for example, exposed to the risk of forgetting whether they have already taken their medicine. By only granting the patient access to the medicament container 200 in specific time intervals such patients can be protected from the risk of an unwanted overdose of the medicament 203.

Preferably, the holding apparatus 100 comprises a lid switch or the like associated with the cover 109 and/or the cover 109 comprises a detection unit 204 in order to make the opening and closing of the cover 109 detectable by the detector device 102. The opening and closing motion of the cover lid 109 can be detected additionally or alternatively to the monitoring of the medicament container 200 itself in order to recognize an access to the medicament container 200.

The cover 109 can alternatively be embodied in a different way than shown in FIG. 2. For example, a sliding cover or a completely removable cover 109, such as a screw-cap or the like, can equally be realized instead of the pivoting cover 109 in the shown example.

FIGS. 3 to 15 show the medication adherence management system 10 according to further embodiments, where in the examples according to FIGS. 3 to 8 and 10 to 15 the medicament container 200 is shown as a pill bottle. However, the described aspects and features equally apply to other medicament containers 200 such as cardboard packages, unless explicitly stated otherwise.

In the case of a pill bottle or another medicament container 200 where the lid 201 is provided as a screw cap or the like, the holding apparatus 100 of the various embodiments is adapted to hold the medicament container 200 in a rotationally fixed manner. This allows for the lid 201 to be easily removable.

The lid 201 preferably comprises grooves 201A or other means to enhance the grip of the lid 201 in order to facilitate unscrewing the lid 201 to open the medicament container 200.

Particularly preferably, the medicament container 200 or its reservoir 202 has a non-circular horizontal cross section, in particular the outer contour of the medicament container 200 or reservoir 202 being non-circular.

The receptacle 101 of the holding apparatus 100 preferably resembles at least essentially the outer shape of the medicament container 200 or reservoir 202, particularly having a similar horizontal cross section and/or inner contour.

More particularly preferably, the medicament container 200 or its reservoir 202 and the corresponding receptacle 101 have an at least essentially square shaped horizontal cross section and/or outer or inner contour, respectively, preferably with the corners being rounded.

Figure 3:
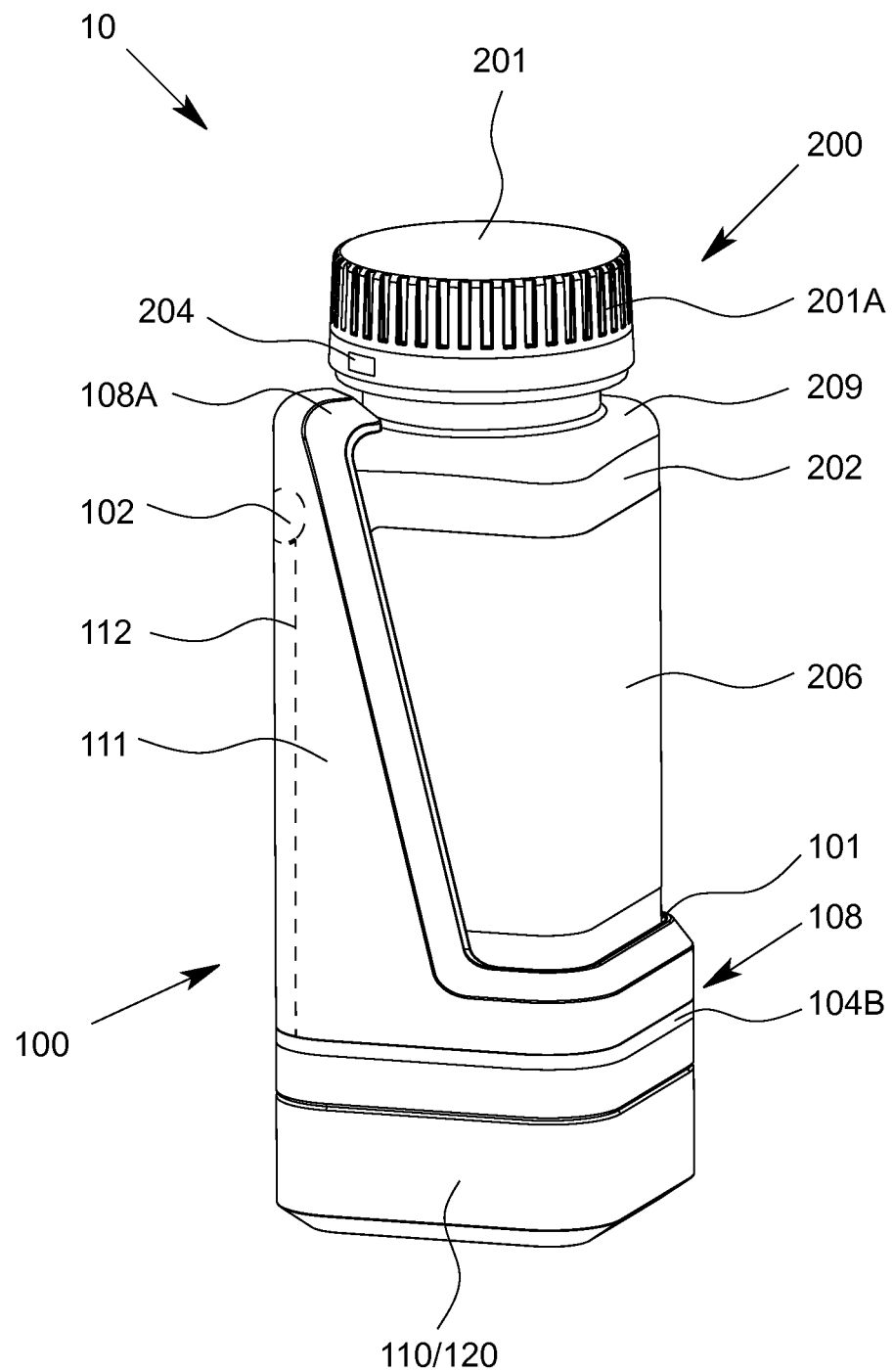
FIG. 3 is a schematic perspective view of a third embodiment of the medication adherence management system in its operating state and/or with inserted medicament container.
Figure 4:
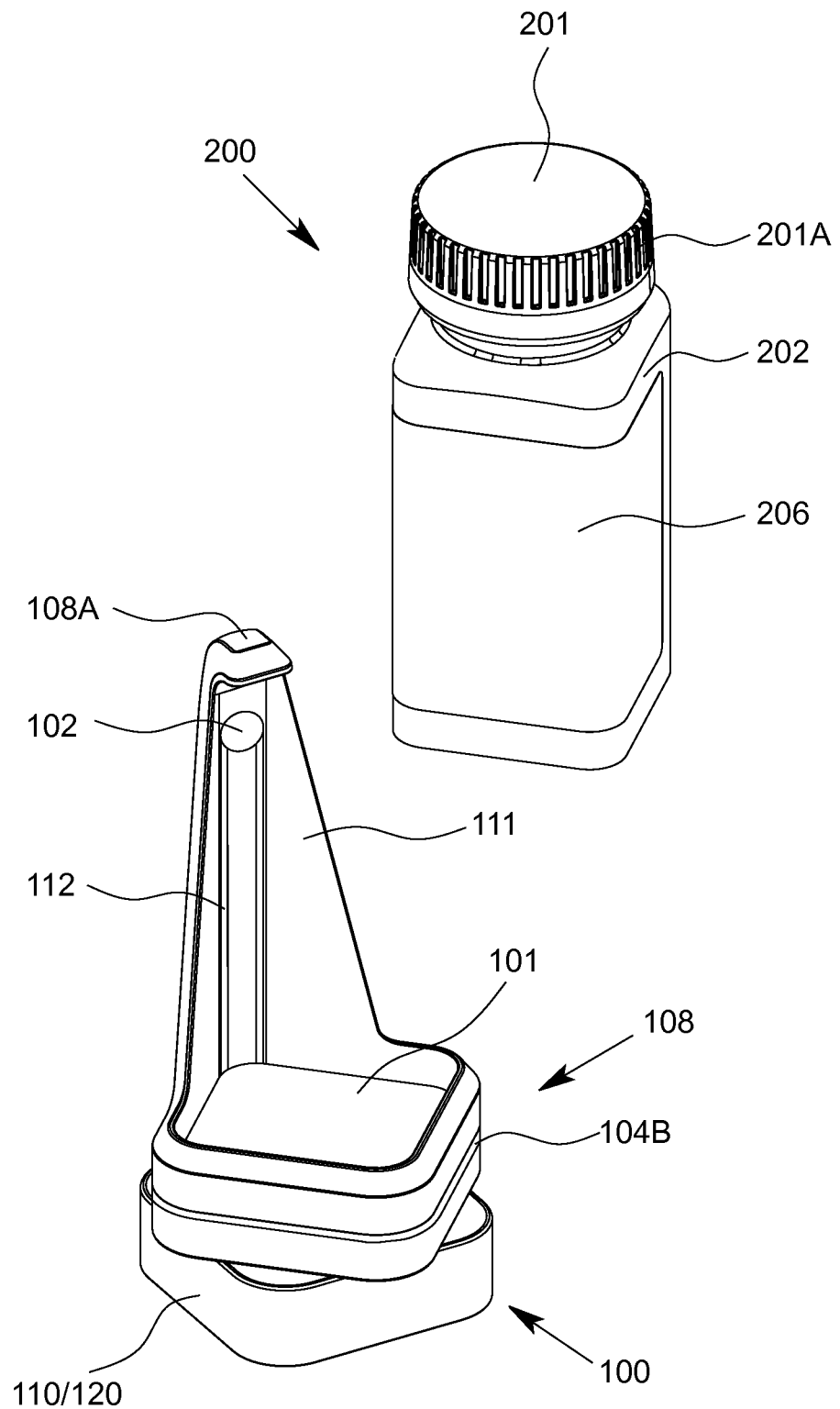
FIG. 4 is a schematic perspective view of the medication adherence management system according to FIG. 3 in the inoperable state and/or with the medicament container removed from the holding apparatus.

FIGS. 3 and 4 show in perspective views the medication adherence management system 10 according to a third embodiment. FIG. 3 shows the medication adherence management system 10 in its operating state and/or with the medicament container 200 fully inserted and secured in the holding apparatus 100. The system 10 before the medicament container 200 is inserted into or after the medicament container 200 has been removed from the holding apparatus 100, respectively, and/or in the inoperable state is shown in FIG. 4.

The medication adherence management system 10 and/or holding apparatus 100 and/or its housing 108 preferably comprises multiple elements, at least a first element 110 and a second element 111.

Preferably, the first element 110 forms a bottom or base 120 of the medication adherence management system 10 or holding apparatus 100 and/or a second element 111 forms at least essentially the receptacle 101 for the medicament container 200.

The second element 111 is preferably designed to cover only a small part of the medicament container 200 or its reservoir 202, in particular comprising a base for receiving the medicament container 200 or reservoir 202 and an arm, stop or shoulder protruding at least essentially vertically from the base supporting the medicament container 200 or reservoir 202.

Alternatively, the first element 110 can be designed both as a base 120 of the system 10 or holding apparatus 100 and a base for receiving the medicament container 200 or reservoir 202 with the second element 111 forming a support such as an arm, stop or shoulder.

Particularly preferably, only one such arm, stop or shoulder is provided covering only an edge of the medicament container 200 or reservoir 202. However, also other structural solutions are possible, such as for example two opposing arms, stops or shoulders or a second element 111 which covers the reservoir 202 of the medicament container 200 completely.

More particularly preferably, when the medicament container 200 is fully inserted into the holding apparatus 100, most of the medicament container 200 is visible, in particular a label 206 which may comprise additional medication information.

Additionally, or alternatively, the arm, stop or shoulder or second element 111 can be transparent, such that the whole medicament container 200 is at least essentially visible.

The second element 111 is preferably flexible in order to insert the medicament container 200 into the holding apparatus 100 or its receptacle 101.

The second element 111 comprises preferably a securing element 108A engaging with the medicament container 200 to securely hold the medicament container 200. The securing element 108A can, for example, take the same form as in the first embodiment, in particular forming a protrusion engaging with a part of the medicament container 200.

Additionally, or alternatively, the medicament container 200 can be fixed at the base of the second element 111.

Preferably, the medicament container 200 can be clipped into the second element 111 or a receptacle 101 formed by the second element 111.

More particularly preferably, the first element 110 can be moved, in particular turned, relatively to the second element 111 to clamp the medicament container 200. In particular, in the inoperable state of the medication adherence management system 10 and/or before the medicament container 200 has been inserted or after it has been removed, the first element 110 is displaced in a receiving or releasing position, in particular twisted with respect to the second element 111, preferably by 45°.

The holding apparatus 100 is designed such that in the inoperable state and/or with displaced first element 110, the medicament container 200 can easily be inserted into or removed from the holding apparatus 100 or its receptacle 101, respectively.

After inserting the medicament container 200 into the receptacle 101, the first element 110 can be moved, in particular turned, preferably by 45° to align with the second element 111. Movement of the first element 110 preferably activates a clamping mechanism to fix the medicament container 200 in the holding apparatus 100 and/or to bring the system 10 into the operating state.

To remove the medicament container 200 from the holding apparatus 100, the first element 110 can be moved back into its receiving or releasing position, which deactivates the clamping mechanism and/or brings the system 10 into the inoperable state.

The clamping mechanism can either be designed such that the diameter of the receptacle 101 is reduced to clamp the medicament container 200 at its bottom and/or such that the bottom of the receptacle 101 or second element 111 is lifted up, which clamps the medicament container 200 between this bottom and the securing element 108A at the top of the second element 111.

In particular, the holding apparatus 100 holds the medicament container 200 in a rotationally fixed manner. This allows for the lid 201, which is preferably a screw cap, to be easily removable.

If a screw cap is provided as lid 201, the medicament container 200 and/or the receptacle 101 have preferably a non-circular cross section. However, in the present embodiment it is also possible for the medicament container 200 to have a circular horizontal cross section and/or cylindrical shape, with the receptacle 101 of the holding apparatus 100 being shaped accordingly. The holding apparatus 100 or its clamping mechanism is preferably capable of securely holding the medicament container 200 in a rotationally fixed manner even for medicament containers 200 with circular horizontal cross section and/or being cylindrically-shaped.

The first element 110 preferably comprises the data processing device 103 and more particularly preferably also a visualization and/or notification device 104, user interface 105, communication device 106 and/or a battery 107. These elements are preferably designed according to the first embodiment shown in FIG. 1.

In FIGS. 3 and 4 the visualization and/or notification device 104 is shown as a light strip 104B encircling the holding apparatus 100. However, the visualization or notification device 104 can also take a different form and/or the holding apparatus 100 can comprise several visualization and/or notification devices 104. For example, a display 104A could be provided additionally or alternatively on the holding apparatus 100.

Preferably, at least one visualization device 104 is visible from any viewing angle of a patient or user.

Additionally, or alternatively, to the notification means described for the first embodiment, for example, notifying a user or patient, when the next medication activity is due, the visualization and/or notification device 104 can also be designed to indicate if the medication adherence management system 10 is in its operating state, in particular if the medicament container 200 has been inserted correctly into the holding apparatus 100. For example, the visualization and/or notification device 104 could show a red light when the medicament container 200 is not or is incorrectly inserted into the holding apparatus 100 and/or when the system 10 is in its inoperable state, and a green light when the medicament container 200 is correctly inserted into the holding apparatus 100 and/or the system 10 is in its operating state.

The second element 111 preferably comprises a detector device 102 for detecting an opening and/or closing of the lid 201. More particularly preferably, the detector device 102 is located close to the lid 201, in particular in the upper part of the second element 111 and/or its securing element 108A.

A corresponding detection unit 204 is preferably located at or inside of the lid 201.

Preferably, the second element 111 further comprises an electrical connection 112, which connects the detector device 102 with the data processing device 103 to transmit electrical signals when an opening and/or closing of the lid 201 is detected by the detector device 102.

In particular, the electrical connection 112 between the detector device 102 and the data processing device 103 can be disconnected in the inoperable state of the medication adherence management system 10 and only be established when moving, in particular turning, the first element 110, preferably to activate the clamping mechanism.

A second detector device 102 and/or detection unit 204 can be located at the bottom of the second element 111 or at the first element 110, preferably to detect when the medicament container 200 loses weight.

Some or all of the elements forming the system 10, holding apparatus 100 and/or housing 108, in particular the first element 110 and second element 111, can be connected non-detachably or can be separable from each other. In the case of separable elements, the elements could be exchangeable, for example, to adapt the receptacle 101 to a different sized and/or shaped medicament container 200.

Figure 5:
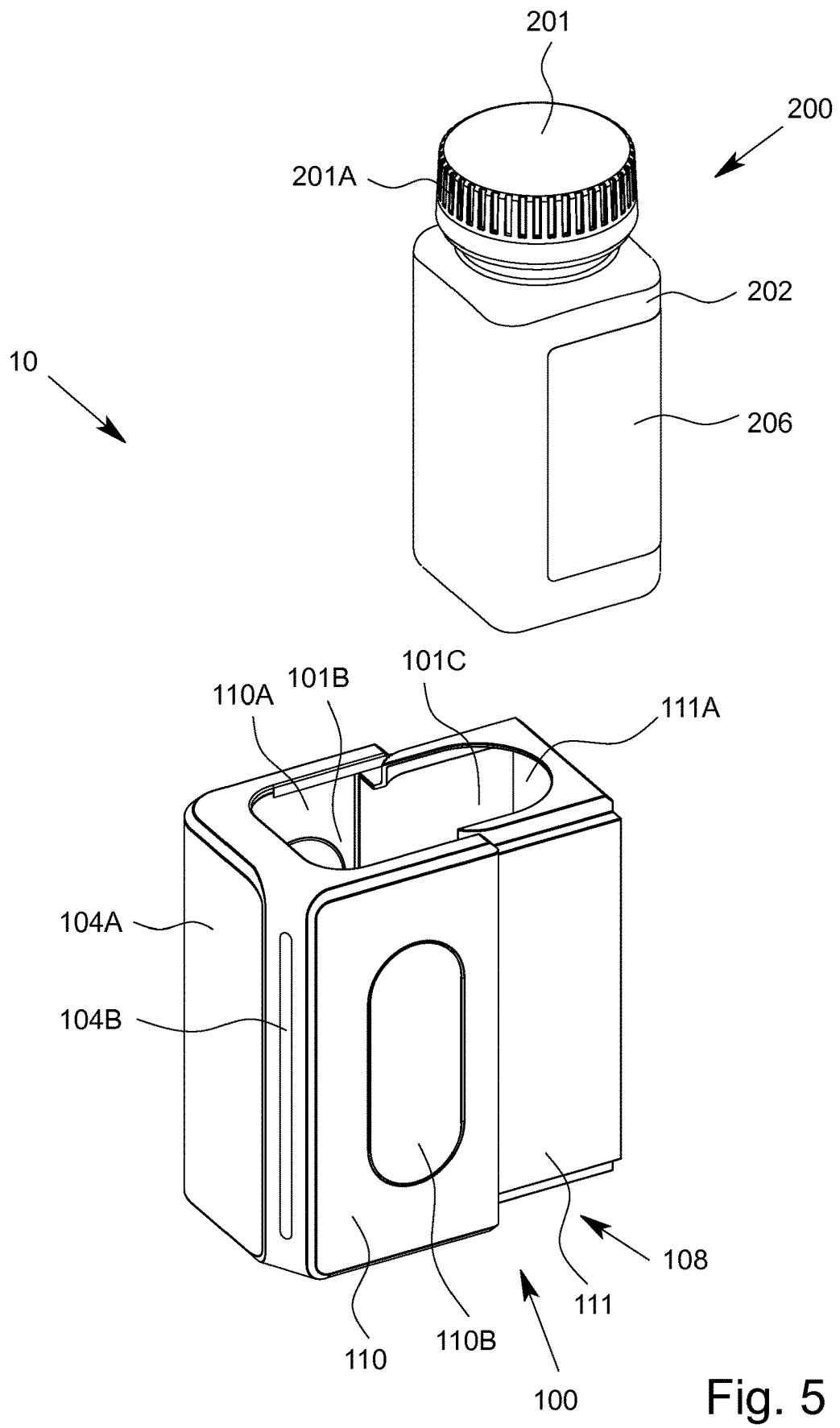
FIG. 5 is a schematic perspective view of a fourth embodiment of the medication adherence management system in its inoperable state and/or with the medicament container removed from the holding apparatus.
Figure 6:
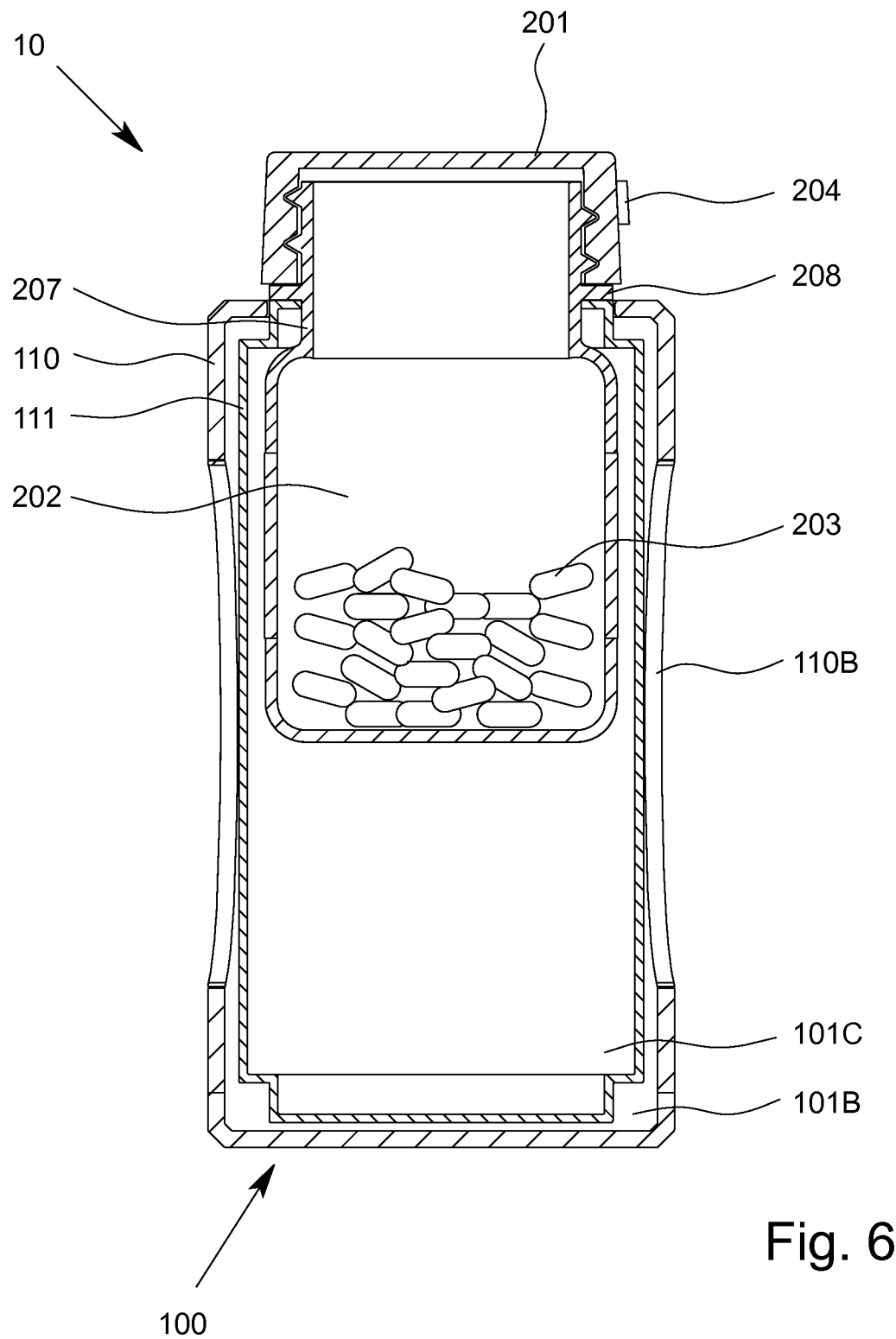
FIG. 6 is a schematic sectional side view of the medication adherence management system according to FIG. 5 with inserted medicament container and/or in the operating state.

FIGS. 5 and 6 show the medication adherence management system 10 according to a fourth embodiment. FIG. 5 shows the system 10 or holding apparatus 100 in its opened or inoperable state, and/or before the medicament container 200 is inserted or after the medicament container 200 has been removed from the holding apparatus 100. FIG. 6 shows a sectional side view of the system 10 in its closed and/or operating state and/or with inserted medicament container 200.

The system 10 and/or holding apparatus 100 and/or housing 108 preferably comprises at least two elements, in particular a first element 110 forming a frame element and a second element 111 forming a drawer element and/or the first element 110 and second element 111 together forming the system 10 and/or holding apparatus 100 and/or housing 108 which is adapted as a drawer.

The first element 110 is preferably at least essentially box-shaped, comprising sidewalls, a top and a bottom, and being in particular open towards one side, and/or having an at least essentially U-shaped horizontal cross section.

The inside of the first element 110 forms a first receptacle 101B of the holding apparatus 100 for receiving the second element 111 and/or medicament container 200.

However, also other shapes of the first element 110 are possible, in particular the shape of the first element 110 and/or first receptacle 101B at least essentially resembling the outer shape of the medicament container 200 and/or second element 111. Preferably, the first element 110 is open towards one side similar to the box-shaped first element 110 shown in FIG. 5.

The first element 110 preferably comprises an opening 110A, in particular at the top, which in shape and size corresponds at least essentially to the medicament container 200 or its reservoir 202, the opening 110A being in particular large enough to insert the medicament container 200 into the first receptacle 101B via the opening 110A and/or from the top.

More particularly preferably, the top of the first element 110 is at least essentially U-shaped, corresponding to the U-shaped horizontal cross section of the first element 110, in order to form the opening 110A.

The detector device 102, data processing device 103 and/or further devices such as a visualization and/or notification device 104, user interface 105, communication device 106 and/or battery 107 are preferably located in one of the sidewalls, more particularly preferably in the sidewall opposite of the open side of the first element 110. However, also other structural solutions are possible, such as locating some or all devices in different parts of the holding apparatus 100 such as the second element 111, the bottom and/or the top of the first element 110.

The detector device 102 is preferably located at a position which is close to the lid 201 of the medicament container 200 when the medicament container 200 is received by the holding apparatus 100 and/or in the operating state of the medication adherence management system 10. Hence, the detector device 102 is preferably located at the top of the first element 110 or the top of one of its sidewalls. Additionally, or alternatively, a detector device 102 can also be located at the second element 111.

The visualization and/or notification device 104 preferably comprises a display 104A which is in particular integrated into one of the sidewalls. The display 104A is preferably invisible and/or turned off when the medication adherence management system 10 is inactive and/or when no medication activity is due and/or when the system 10 is not accessed directly or remotely or via a user or patient.

The visualization and/or notification device 104 can further comprise a light strip 104B running preferably vertically along one of the sidewalls.

In particular, the light strip 104B can be designed to indicate a percentage, for example the number of medicament 203 left in the medicament container 200 and/or battery charge, by being illuminated only partly corresponding to the respective percentages.

Preferably at least one sidewall is transparent, in particular both sidewalls which are opposite of each other and/or adjacent to the open side of the first element 110, such that the medicament container 200 is at least partly visible when fully inserted and/or in the operating state of the medication adherence management system 10.

The second element 111 preferably has at least essentially a similar shape as the first element 110, in particular comprising sidewalls, a bottom and a top, and/or the outer shape of the second element 111 resembles the first receptacle 101B formed by the inside of the first element 110. Preferably, the second element 111 has an open side similar to the first element 110.

The inside of the second element 111 preferably forms a second receptacle 101C for receiving the medicament container 200 or a reservoir 202 thereof.

The distance between two opposing sidewalls of the second element 111 is preferably smaller than for the first element 110, such that the second element 111 fits into the first receptacle 101B.

The second element 111 is preferably located inside of the first receptacle 101B of the first element 110 and is movable out of the first receptacle 101B via the open side of the first element 110.

Preferably, the second element 111 fits snugly into the first receptacle 101B of the first element 110, in particular when fully inserted the second element 111 or a sidewall thereof closes off the open side of the first element 110 such that the holding apparatus 100 is closed on all four sides.

In particular, when the second element 111 is received by the first receptacle 101B of the first element 110, at least essentially no clearance is provided between adjacent sidewalls of first element 110 and second element 111.

Preferably the second element 111 is movable or slideable in the first receptacle 101B of the first element 110. The first element 110 and second element 111 preferably form a drawer which can be opened by moving the second element 111 out of the first receptacle 101B of the first element 110 and can be closed by moving the second element 111 into the first receptacle 101B of the first element 110.

Particularly preferably, the first element 110 and second element 111 are inseparable from each other, in particular the second element 111 can be moved out of the first receptacle 101B of the first element 110, but cannot be removed from the first element 110 completely. The first element 110 and second element 111 can for example comprise stop elements which engage with each other when the holding apparatus 100 is completely opened and prevent the second element 111 to be moved further.

When fully received by the first receptacle 101B of the first element 110 and/or in the closed state of the holding apparatus 100, the first element 110 and second element 111 are preferably held together, in particular by force-fit, form-fit and/or snap-fit, such that the holding apparatus 100 cannot accidentally be opened.

The second element 111 is preferably transparent such that the medicament container 200 is visible from at least three sides when fully inserted into the holding apparatus 100 and/or in the operating state of the medication adherence management system 10.

The two opposing sidewalls of the first element 110 preferably comprise each a grip portion 110B making it easy to grip the holding apparatus 100 with one hand, in particular when opening or closing the drawer. The grip portions 110B can be indentions, depressions, holes and/or windows in the respective sidewalls.

The medicament container 200 preferably comprises a tapered part or neck 207, in particular located between its reservoir 202 and lid 201.

More particularly preferably, the medicament container 200 comprises a flange 208 around its tapered part or neck 207.

The second element 111 has an opening 111A corresponding to the dimensions of the medicament container 200, in particular the diameter of the opening 111A being larger than the diameter of the medicament container 200 at its tapered part or neck 207 but smaller than the diameter of the flange 208.

Preferably the holding apparatus 100 holds the medicament container 200 at its neck 207 or flange 208. More particularly preferably, the medication adherence management system 10 is adapted so that the medicament container 200 hangs in the holding apparatus 100 while being held at its neck 207, in particular with the flange 208 resting on the edge of the opening 111A, as shown in FIG. 6.

When inserting the medicament container 200 into the holding apparatus 100, the first step is to move the second element 111 out of the first receptacle 101B of the first element 110, in particular opening the drawer-like holding apparatus 100. This enlarges the opening at the top of the holding apparatus 100. In the next step, the medicament container 200 is inserted into the first receptacle 101B via the large opening 110A of the first element 110. In the final step, the second element 111 is moved back into the first receptacle 101B with the flange 208 and the lid 201 being located above the opening 111A of the second element 111, the second element 111 preferably being clipped together with the first element 110 to secure the second element 111 in the first receptacle 101B. By this procedure, the reservoir 202 of the medicament container 200 is received by the second receptacle 101C and the opening at the top of the holding apparatus 100 is reduced such that the medicament container 200 hangs in the holding apparatus 100 while being held at its neck 207 and/or flange 208.

In addition, or as an alternative, to detect an opening and/or closing of the lid 201, the system 10 or holding apparatus 100 can also be designed to detect a loss of weight of the medicament container 200. Preferably, a detector device 102 is located at the top of the first element 110 or second element 111, detecting the weight of the medicament container 200 and/or the gravitational force exerted by the medicament container 200 while hanging in the holding apparatus 100.

In a preferred embodiment, the first receptacle 101B and/or second receptacle 101C is/are designed to receive differently shaped and/or sized reservoirs 202 of medical containers 200. For example, the reservoirs 202 could differ in their vertical lengths, leaving a clearance between the bottom of the medicament container 200 and the bottom of the first element 110 and/or second element 111. FIG. 6 shows an example of a smaller medicament container 200 being held by a holding apparatus 100.

It is also possible to design the system 10 or holding apparatus 100 such that the first element 110 and second element 111 can be separated from each other, preferably by providing a button which can be pressed to release the elements or the like.

In particular, the first element 110 and/or second element 111 can be exchangeable. For example, different second elements 111 can be provided which correspond to different medicament container 200, such that the medicament container 200 fits into the second receptacle 101C of the second element 111 with at least essentially no clearance. The first element 110 can then be designed to receive different second elements 111, in particular with a clearance between the bottom of the second element 111 and the bottom of the first element 110.

In the preferred embodiment, the medication adherence management system comprises a medicament container 200 which hangs in the holding apparatus 100 while being held at its neck 207, wherein the holding apparatus 100 is designed as a drawer for inserting the medicament container 200 into the receptacle 101. However, also other structural solutions are possible.

For example, the top of the first element 110 itself could have an opening with its diameter being smaller than the diameter of the flange 208 of the medicament container 200. The second element 111 is then preferably just a sidewall of the holding apparatus 100, more particularly preferably connected with a sidewall of the first element 110 via a hinge such that it can be opened like a door. Inserting the medicament container 200 would then comprise the steps of opening the door-like second element 111, inserting the medicament container 200 via the open side of the first element 110, in particular not from the top, and then securing the medicament container 200 in the holding apparatus 100 by closing the door-like second element 111.

Another possible structural solution is, for example, the holding apparatus 100 comprising a first element 110 and second element 111 which are completely separable from each other and can be placed around the medicament container 200 and then connected with each other.

Figure 7:
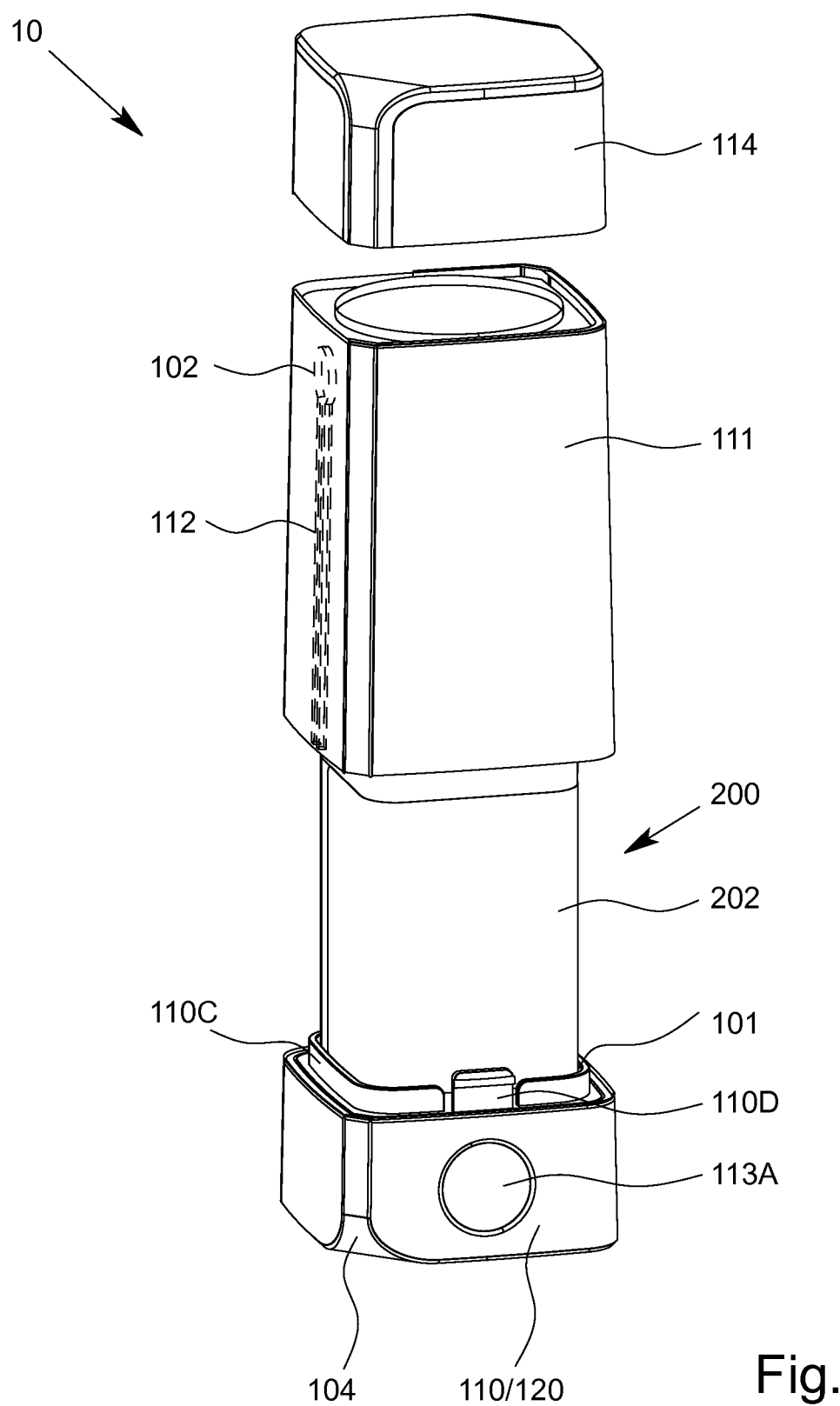
FIG. 7 is an exploded perspective view of a fifth embodiment of the medication adherence management system.

FIG. 7 shows the medication adherence management system 10 according to a fifth embodiment in an exploded perspective view.

The system 10, holding apparatus 100 and/or housing 108 comprises at least two elements, in FIG. 7 three elements. The elements are in particular modular and/or separable from each other.

A first element 110 preferably forms the bottom or base 120 of the medication adherence management system 10 or holding apparatus 100.

Preferably, the first element 110 comprises the data processing device 103 and additional devices such as a weight detector device 102, visualization and/or notification device 104, user interface 105, communication device 106 and/or battery 107.

In the embodiment shown in FIG. 7, the bottom of the first element 110 can be illuminated as a visualization and/or notification device 104. However, also other or additional structural solutions are possible, for example, providing a light strip 104B encircling the first element 110 similar to the solution shown in FIG. 3 of the third embodiment. Also a display 104A could be provided on the first element 110, second element 111 or any further element of the system 10, holding apparatus 100 and/or housing 108.

The first element 110 preferably comprises a receptacle 101 which fits the medicament container 200. Preferably, the medicament container 200 or its reservoir 202 is fixed using a frame 110C located at the top of the first element 110. FIG. 7 shows the medicament container 200 already being inserted into the first element 110.

A second element 111 preferably is placed over the medicament container 200 and/or forms a sleeve for the medicament container 200, in particular being having sidewalls and/or a mantle with an opening at the top and the bottom. Preferably, the second element 111 at least essentially resembles the shape of the medicament container 200, in particular its vertical length is such that only the lid 201 of the medicament container 200 sticks out of the second element 111 at its top. For that purpose, the opening at the top of the second element 111 can be shaped that only the lid 201 fits through the opening.

More particularly preferably, the holding apparatus 100 is adaptable to the size and/or shape of the medicament container 200, in particular by providing different second elements 111 which correspond to different medicament container 200 shapes and/or sizes, and which fit universally with the first element 110.

Alternatively or additionally, also the first element 110 can be exchangeable to adapt, for example, to different medicament container 200 sizes and/or shapes, and/or to adapt to different medication adherence management needs, for example by different first elements 110 comprising different devices as required, e.g., different communication devices 106, different electrical power supplies such as a battery 107 or via a power cable, different visualization and/or notification devices 104, or the like.

The second element 111 is preferably transparent such that the reservoir 202 or label 206 thereof is still visible when the sleeve-like second element 111 covers the medicament container 200. Additionally, or alternatively, the second element 111 can comprise recesses or windows to leave the medicament container 200 partly visible.

The second element 111 preferably comprises a detector device 102 for detecting an opening and/or closing of the lid 201, the detector device 102 being located close to the lid 201.

The second element 111 further comprises preferably an electrical connection 112 which connects the detector device 102 with the data processing device 103 located in the first element 110. In particular, this electrical connection 112 is only established when the first element 110 and second element 111 are connected with each other.

The holding apparatus 100 can comprise further elements which are preferably modular and/or exchangeable. For example, several sleeve-like modular elements could be stacked on top of each other to cover the medicament container 200 or its reservoir 202. To adjust the holding apparatus 100 to larger medicament container 200 sizes, instead of exchanging the second element 111, the holding apparatus 100 is then preferably enlarged by stacking a third sleeve-like element on top of the second element 111.

The modular elements preferably can be clipped together, in particular by a snap-fit. The first element 110 can, for example, comprise a latch or lug 110D which engages with the second element 111.

Particularly preferably, at least one of the modular elements comprises a button 113 for unlocking the modular elements.

In a preferred embodiment, the holding apparatus 100 comprises a further element which acts as a cap 114.

The cap 114 is preferably adapted to receive and connect with the lid 201 of the medicament container 200 in a force-fit, form-fit and/or snap-fit manner. In particular, the cap 114 can be clipped or plugged onto the lid 201, preferably from the top.

Figure 8:
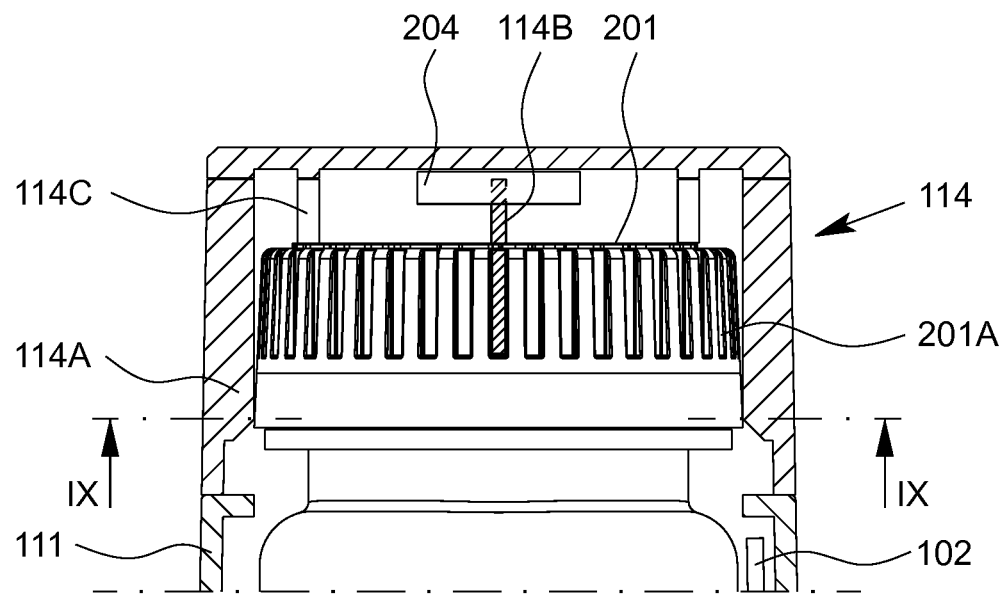
FIG. 8 is a schematic sectional side view of a cap according to the embodiment shown in FIG. 7.
Figure 9:
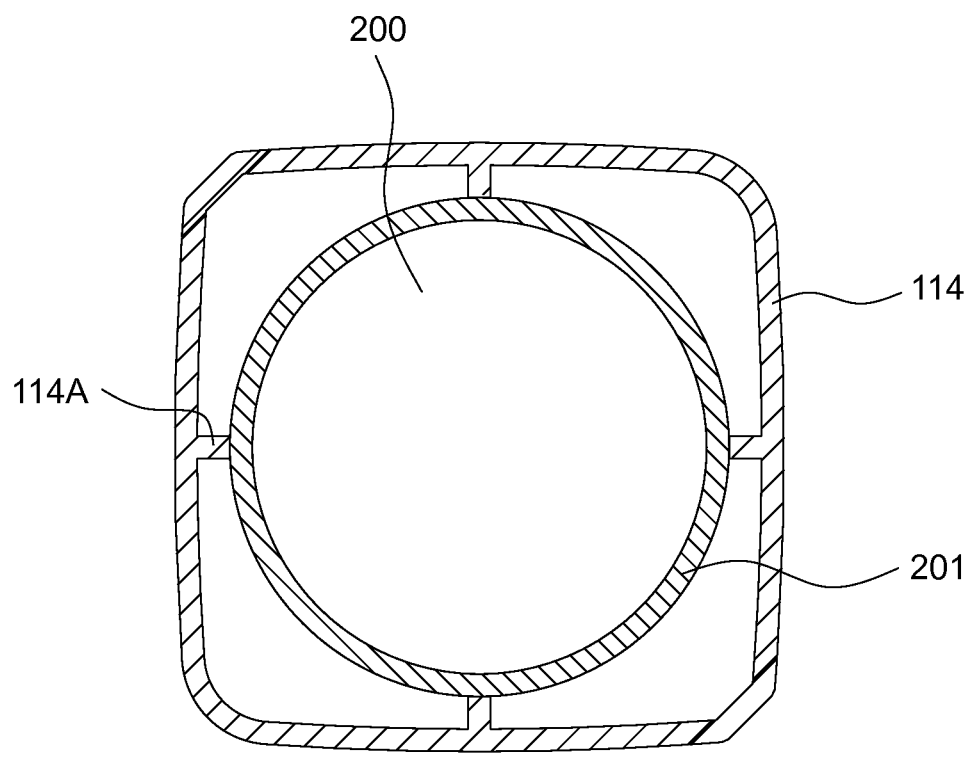
FIG. 9 is a schematic view of a horizontal section along the line IX-IX in FIG. 8.

FIG. 8 shows in a schematic side view a medicament container 200 inside of a holding apparatus 100 according to the present embodiment with a cap 114. The front side of the second element 111 and of the cap 114 has been removed in the figure for illustrative purpose. FIG. 9 shows a horizontal section along the line IX-IX in FIG. 8.

Preferably, the cap 114 completely covers the lid 201, in particular on all sides and on the top.

Alternatively, the cap 114 could have an opening at its side such that the cap can be clipped or plugged onto the lid 201 in radial direction of the lid 201 and/or from the side.

Preferably, a tangential force exerted onto the cap 114 is transferred onto the lid 201. This allows to unscrew the lid 201 by turning the cap 114 in order to open the medicament container 200.

In particular, the cap 114 and the lid 201 are rotatably coupled with each other. Thus, the lid 201 can preferably be removed and/or the medicament container 200 can preferably be opened by turning and/or unscrewing the cap 114.

The cap 114 and the lid 201 are preferably connected with each other such that they form a unit being together removable from and attachable to the reservoir 202.

Preferably, the cap 114 and lid 201 are connected together detachably such that the cap 114 is removable from the lid 201, for example, when exchanging the medicament container 200. However, it is also possible to design the cap 114 in such a way that it cannot be removed from the lid 201 once connected.

In the example shown in FIGS. 8 and 9, the cap 114 comprises holding portions 114A which hold the lid 201 of the medicament container 200. In particular, four holding portions 114A are provided, preferably one on each side of the cap 114 and/or where the distance between lid 201 and cap 114 is the smallest. Preferably, the holding portions 114A are integrally formed with the sides of the cap 114 and/or protrude towards the lid 201, in particular from the side.

In the example, the holding portions 114A connect with the lid 201 by force-fit. However, it is also possible to design the holding portions 114A such that they connect with the lid 201 by other means, for example form-fit and/or snap-fit.

Additionally, or alternatively, the cap 114 can comprise engaging portions 114B which engage with the lid 201, in particular engaging with a groove 201A provided in the cap 114. FIG. 8 shows exemplarily one such engaging portion 114B, however, several engaging portions 114B can be provided. The engaging portions 114B preferably protrude vertically from the inside of the top of the cap 114 towards the lid 201.

The engaging portions 114B connect with the grooves 201A or the lid 201 in particular by form-fit, such that a tangential force exerted onto the cap 114 is transferred onto the lid 201 and/or such that the lid 201 can be unscrewed by turning the cap 114 and removable together with the cap 114 to open the medicament container 200.

The cap 114 can further comprise stabilizing portions 114C which protrude vertically from the inside of the top of the cap 114 towards the lid 201. These portions 114C are preferably located closer to the center of the top of the cap 114 than the engaging portions 114B. In particular, the portions 114C further support the connection between the cap 114 and lid 201 and/or prop the cap 114 on the lid 201. The portions 114C can also provide a clearance between the lid 201 and the top of the cap 114.

Further, the portions 114C and lid 201 can be designed such that the portions 114C can engage with corresponding recesses in the lid 201, in particular to provide an additional or alternative connection between the lid 201 and cap 114.

Additionally, or alternatively, to the lid 201 having a detection unit 204 being detectable by the detector device 102, the cap 114 can be provided with a detection unit 204. The detection unit 204 can be integrated into the cap 114 or can be placed at the cap 114, preferably at the inside of the cap 114. Alternatively, the detection unit 204 can sit between cap 114 and lid 201, preferably on top of the lid 201.

To assemble the medication adherence management system 10 according to the fifth embodiment, the first step is to insert the medicament container 200 into the receptacle 101 of a first element 110 and to fix the medicament container 200 therein. Then, a sleeve-like second element 111 which corresponds to the shape and size of the medicament container 200 is placed over the medicament container 200, and the first element 110 and second element 111 are connected with each other, preferably by snap-fit. An optional cap 114 is then clipped or plugged onto the lid 201 of the medicament container 200.

Inserting first the medicament container 200 into the first element 110 and then assembling the holding apparatus 100 facilitates to insert the medicament container 200 correctly and/or to fix and secure the medicament container 200 in the holding apparatus 100 correctly. In particular the system 10 or holding apparatus 100 can be designed such that it is not possible to insert the medicament container 200 at a later step, for example, by providing an opening at the top of the sleeve-like second element 111 having a diameter large enough to receive the lid 201, but too small to receive the reservoir 202 of the medicament container 200.

With the cap 114 provided, the medicament container 200 is preferably inserted completely or received completely in the holding apparatus 100 or receptacle 101 thereof, in particular without any part of the medicament container 200 sticking out of the holding apparatus 100.

The holding apparatus 100 can be designed watertight and/or gastight, in particular protecting the medicament container 200 or medicament 203 from environmental influences.

The cap 114 can also be connectable with the second element 111. Then, to open the medicament container 200, the cap 114 has to be released or unlocked from the second element 111 in a first step, preferably by pressing a release button, and has to be removed from the medicament container 200, preferably together with the lid 201, in a second step. In particular, the unlocking mechanism can be designed to prevent the system 10 to be accessible by an unauthorized user and/or such that the system 10 is accessible only at certain times such as when a medication activity is due.

To open the medicament container 200, the cap 114 and lid 201 are removed from the holding apparatus 100, preferably together as a unit, more particularly preferably by exerting a tangential force onto the cap 114 and/or by unscrewing the cap 114 together with the lid 201.

Alternatively, the lid 201 of the medicament container 200 can be completely removed from the medicament container 200 when inserting the medicament container 200 into the holding apparatus 100 and/or in the operating state of the medication adherence management system 10. In particular, the medicament container 200 is placed opened into the holding apparatus 100. The cap 114 then replaces the lid 201.

In particular, the cap 114 can be designed to be directly screwable and/or attachable to the medicament container 200 with its lid 201 removed. Alternatively, the cap 114 can be designed as a cover 109, in particular connecting with the second element 111, but not with the medicament container 200.

Figure 10:
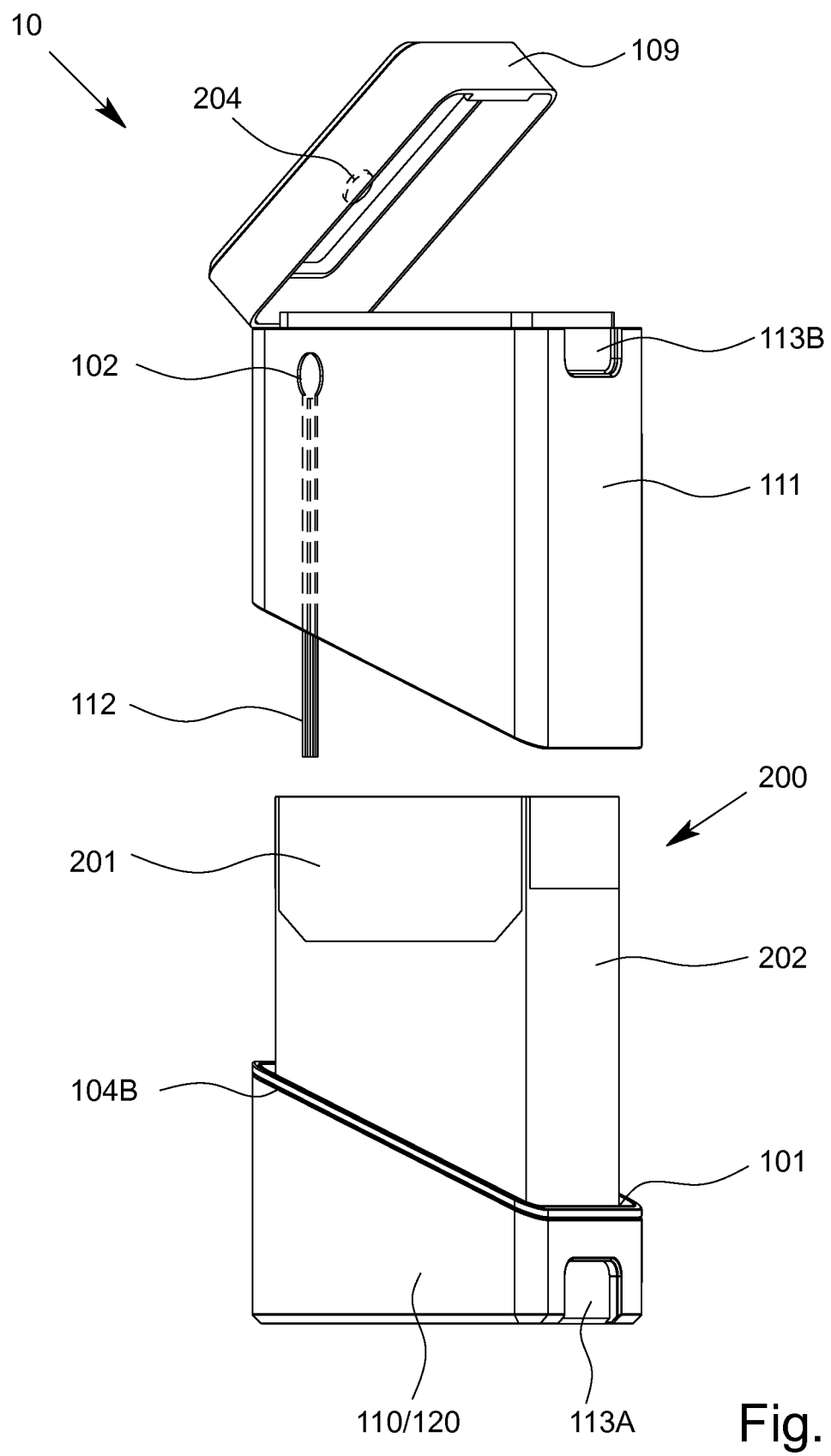
FIG. 10 is an exploded perspective view of a sixth embodiment of the medication adherence management system.

FIG. 10 shows a sixth embodiment of the medication adherence management system 10. In this embodiment, the medicament container 200 is preferably a cardboard package as in the second embodiment shown in FIG. 2. However, all aspects and features apply equally to other medicament containers 200 such as pill bottles unless explicitly stated otherwise.

The holding apparatus 100 preferably comprises at least two modular elements, for example to adapt to different sizes and/or shapes of medicament containers 200 and/or to facilitate inserting or removing the medicament container 200 into or from the holding apparatus 100, respectively.

A first element 110 preferably forms the bottom or base 120 of the holding apparatus 100 and/or comprises a receptacle 101 for receiving the medicament container 200.

The first element 110 preferably comprises the data processing device 103, the visualization and/or notification device 104, user interface 105, communication device 106, and/or battery 107. However, locating some or all of these devices in a different part of the holding apparatus 100 is also possible.

The first element 110 or the receptacle 101 preferably has an at least essentially rectangular horizontal cross section and/or a horizontal cross section corresponding at least essentially to the horizontal cross section of the medicament container 200.

The vertical cross section of the first element 110 does not need to be rectangular, and can take different shapes, for example a trapezoidal form as shown in FIG. 10.

A sleeve-like second element 111 preferably has a shape corresponding to the first element 110 and/or medicament container 200.

The second element 111 is preferably placed over the medicament container 200, such that the medicament container 200 is completely covered. However, the second element 111 is preferably at least partly transparent such that the medicament container 200 is at least essentially visible, in particular a label 206 thereof.

The second element 111 is preferably connectable with the first element 110, more particularly preferable by a snap-fit.

Preferably, the first element 110 comprises a release button 113A to unlock or release the second element 111. However, the button 113 can also be provided at the second element 111.

The system 10 and/or holding apparatus 100 preferably comprises a cover 109.

The cover 109 can be a further separable element, in particular being removable from the second element 111. Particularly preferably, the cover 109 is inseparably connected with the second element 111, in particular via a hinge such that the cover 109 is pivotable with respect to the second element 111.

The cover 109 preferably completely covers the opening at the top of the second element 111 and/or the top of the medicament container 200. In particular, the medicament container is completely received in the holding apparatus 100. Particularly preferably, the holding apparatus 100 is water- and/or gastight and/or is designed to protect the medicament container 200 or medicament 203 from environmental influences, even if the medicament container 200 is placed open and/or without a lid 201 into the holding apparatus 100.

The cover 109 preferably engages with the second element 111 by form-fit and/or snap-fit in the closed state of the holding apparatus 100 such that the holding apparatus 100 cannot accidentally be opened.

Preferably, the second element 111 and/or cover 109 comprises an opening button 113B to unlock the cover 109 such that it can be pivoted in order to open the holding apparatus 100.

Additionally, or alternatively, the unlocking mechanism of the cover 109 can be designed to prevent an unauthorized opening of the holding apparatus 100 and/or unauthorized access to the medicament container 200. For example, a patient or user may be required to enter an access code via a user interface 105 to unlock the cover 109, a device reading biometrical data, e.g., a fingerprint reader, can be provided in the holding apparatus 100, or the like. It is also possible to adapt the unlocking mechanism such that the cover 109 unlocks only at specific times, e.g., when a medication activity is due, and/or that the cover 109 can be locked or unlocked remotely.

Particularly preferably, the medication adherence management system 10 detects a medication activity by detecting an opening and/or closing of the cover 109.

The cover 109 preferably comprises a detection unit 204 and/or has a detection unit 204 attached to it, in particular in the inside of the cover 109, which is detectable by a detector device 102, preferably located in the second element 111.

More particularly preferably the detection unit 204 is located at least essentially in close proximity to the detector device 102.

Additionally, or alternatively, the opening and/or closing of the cover 109 can be detected by other detection means, for example, detection of pressing the button 113B to unlock the cover 109, detection of a force exerted on the hinge where the cover 109 and second element 111 are connected with each other, disruption of an electrical connection when the cover 109 is opened and/or the like.

The medicament container 200 is preferably open in the operating state of the medication adherence management system 10. In particular, a medicament 203 can be taken from the medicament container 200 or its reservoir 202 after opening the cover 109 without the need to open the lid 201 of the medicament container 200. In the case that the medicament container 200 is a cardboard package, the lid 201 is a flap which is preferably folded down. For other medicament containers 200, the lid 201 is preferably displaced or completely removed from the medicament container 200 before inserting the medicament container 200 into the holding apparatus 100.

In particular, the medication adherence management system 10 or holding apparatus 100 is adapted such that the medicament 203 can be taken out of the medicament container 200 with the medicament container 200 being held in the holding apparatus 100, in particular without the need to remove the medicament container 200 from the holding apparatus 100, even in the case of a cardboard package.

The medication adherence management system 10 according to the present embodiment shown in FIG. 10 is assembled as follows. In a first step the medicament container 200 is opened with the lid 201 being folded down, displaced or removed. Then, the medicament container 200 is inserted and secured in the receptacle 101 of the first element 110. In the final step the second element 111 which is preferably inseparably connected with the cover 109 is placed over the medicament container 200 and connected with the first element 110, preferably by clipping the second element 111 into the first element 110 and/or by snap-fit.

Alternatively, the holding apparatus 100 can be assembled in a first step or can already be provided as a single unit and the medicament container 200 is inserted into the holding apparatus 100 with the cover 109 opened or, at least temporarily, completely removed.

FIGS. 11 to 14 show the medication adherence management system 10 according to a seventh embodiment.

Figure 11:
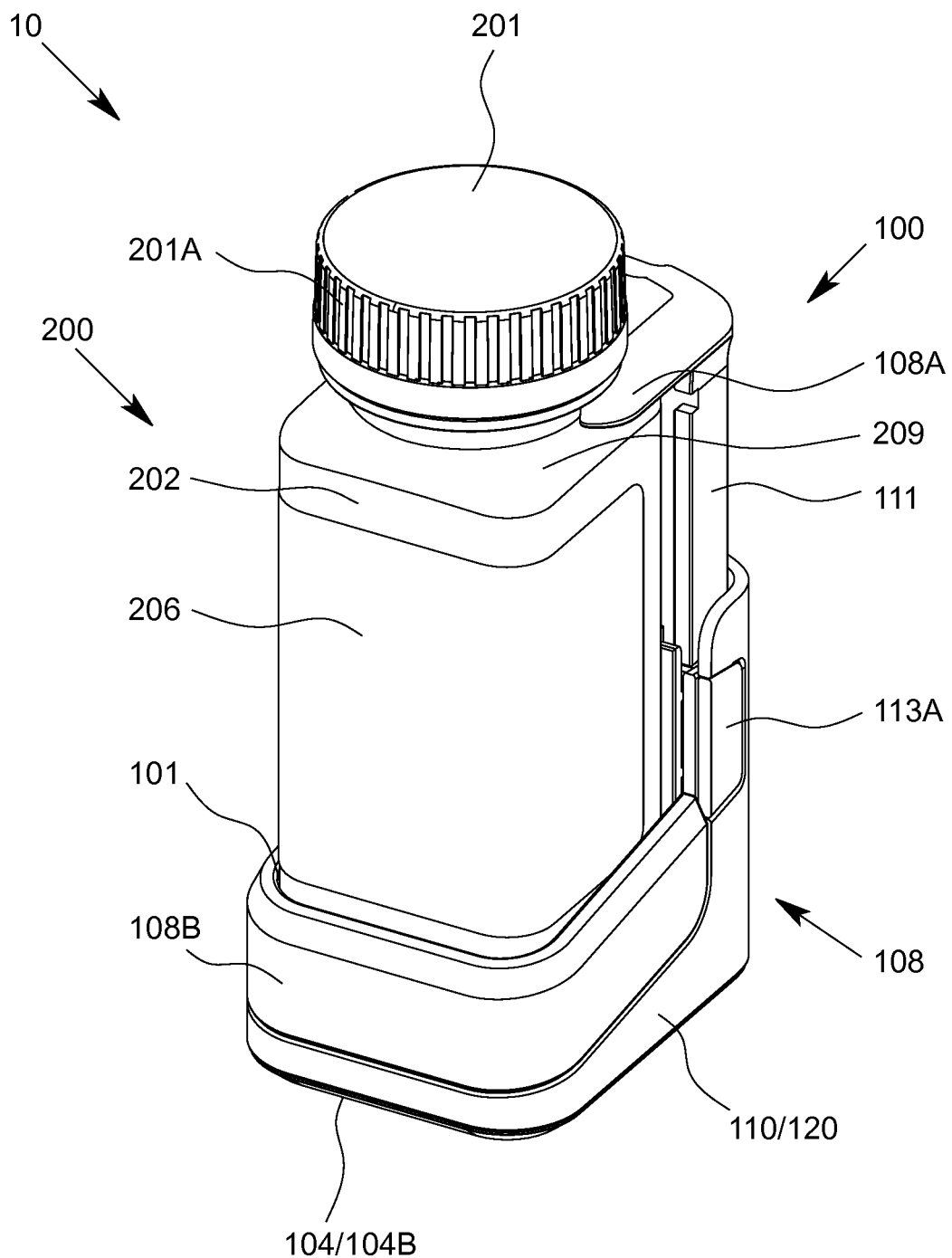
FIG. 11 is a schematic perspective view of a seventh embodiment of the medication adherence management system with inserted medicament container and/or in the operating state.
Figure 12:
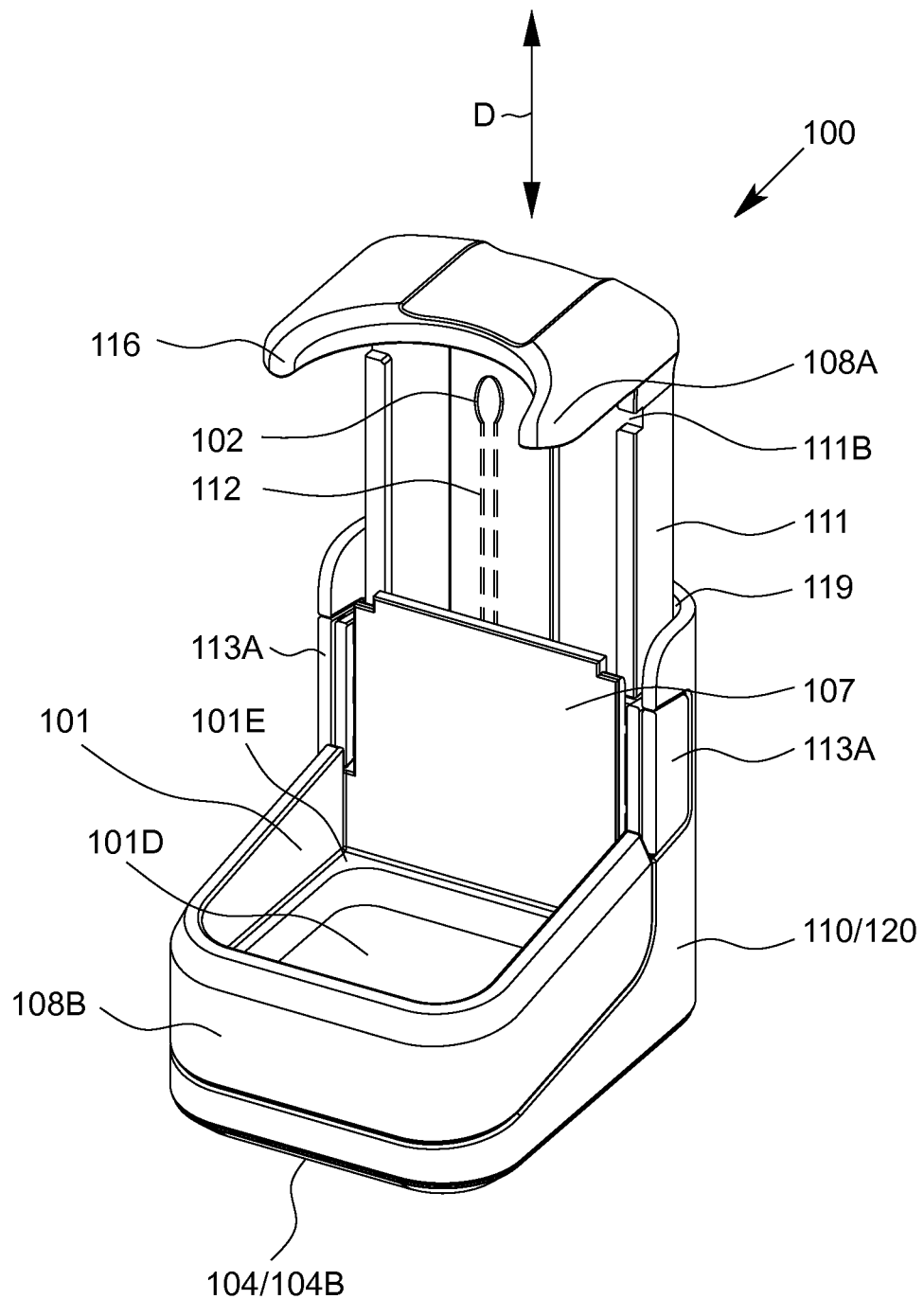
FIG. 12 is a schematic perspective view of the medication adherence management system of FIG. 11 with the medicament container removed from the holding apparatus and/or in the inoperable state.

FIG. 11 shows the medication adherence management system 10 in a schematic perspective view with inserted medicament container 200 and/or in the operating state, whereas FIG. 12 shows the medication adherence management system 10 and/or holding apparatus 100 according to FIG. 11, but in the inoperable state and/or without the medicament container 200.

The medication adherence management system 10, holding apparatus 100 and/or housing 108 comprises or is formed preferably by at least two elements, in particular a first element 110 and a second element 111.

Preferably, the first element 110 comprises or forms the receptacle 101 or vice versa.

The first element 110 or receptacle 101 preferably comprises or forms a bottom or base 120 of the holding apparatus 100 and/or is fixedly connected thereto.

Preferably, the first element 110 and/or bottom or base 120 contains or receives the data processing device 103, memory 103A, time base 103B, user interface 105, communication device 106 and/or battery 107.

Alternatively, or additionally, the medication adherence management system 10, holding apparatus 100, first element 110 and/or base 120 can also comprise a control device 115 for controlling the medication adherence management system 10 and/or providing the desired functionality of the medication adherence management system 10.

The control device 115 can, in particular, comprise the detection device 102, data processing device 103, memory 103A, time base 103B, visualization device 104, user interface 105, communication device 106 and/or battery 107. However, some or all of the components 102 to 107 can also be realized separately from the control device 115.

Figure 13:
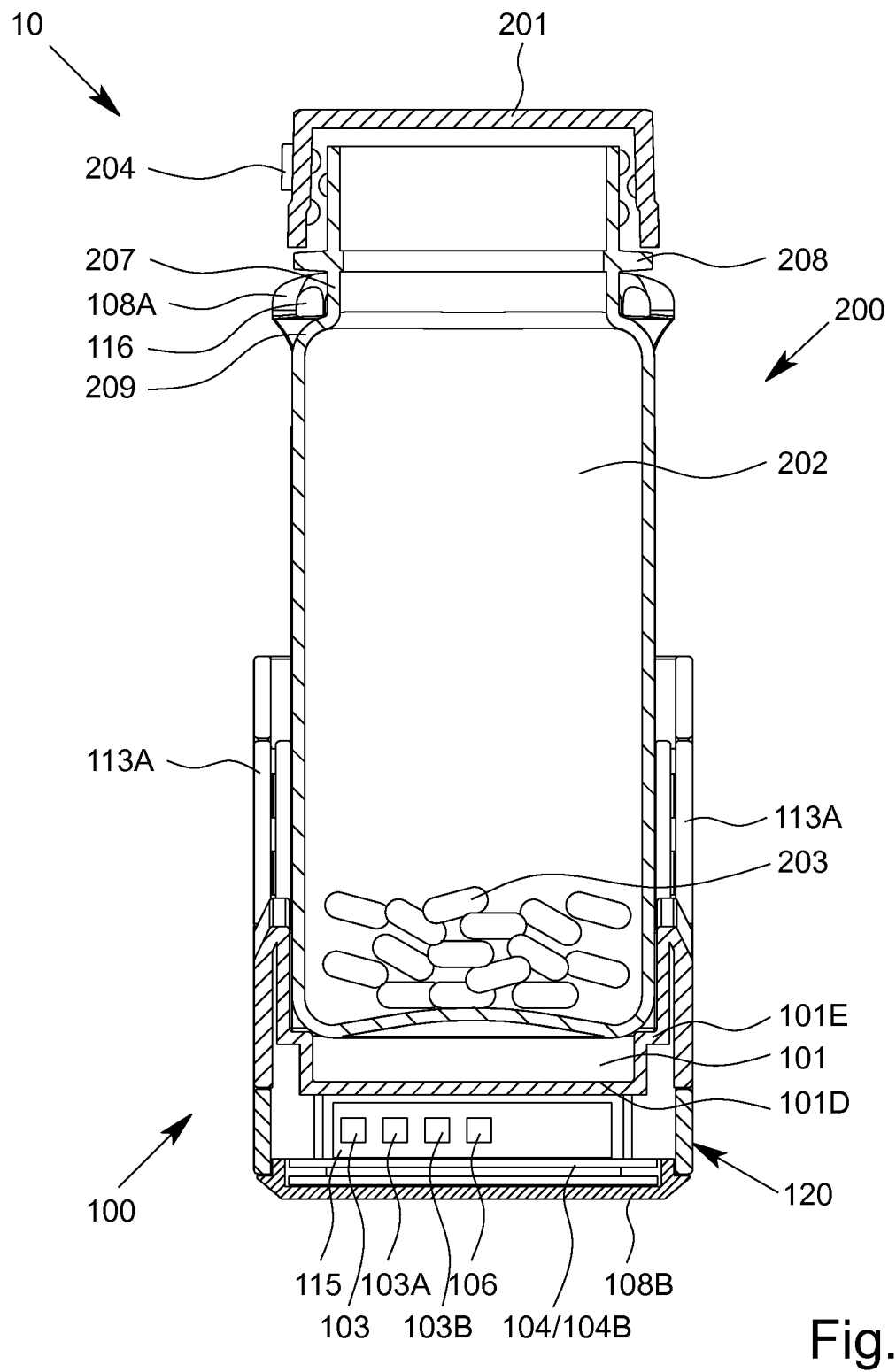
FIG. 13 is a schematic sectional side view of the medication adherence management system according to FIG. 11.

In the example, the control device 115 is located in the bottom or base 120 of the holding apparatus 100, as shown in FIG. 13, whereas the battery 107 is located at a side of the holding apparatus 100 or receptacle 101 as shown in FIG. 12. However, other solutions are also possible in which the components 102 to 107 and/or control device 115 are located elsewhere in or at the holding apparatus 100, for example also in the second element 111. In particular, the positions of the control device 115 and battery 107 can also be reversed.

The control device 115 is preferably configured to control the medication adherence management system 10 and/or some or all of the devices comprised therein, such as the detector device 102, data processing device 103, memory 103A, time base 103B, visualization device 104, user interface 105 and/or communication device 106. In particular the control device 115 can control the communication between these devices, for example between the detector device 102 and data processing device 103. The control device 115 preferably can further be configured to perform similar features or tasks as the aforementioned devices and can in particular also replace some of the aforementioned devices.

Particularly preferably, the control device 115 can also be realized in any of the previously described embodiments.

In the example, the visualization device 104 comprises or forms or is realized as a light emitting element, such as one or more LEDs and/or a light strip 104B, preferably located at the bottom or base 120 of the medication adherence management system 10 or holding apparatus 100 or housing 108 or first element 110.

In particular, the visualization device 104 or light strip 104B fully encircles the holding apparatus 100, such that it is visible from all sides and/or any perspective and/or any viewing angle. This ensures that the visualization device 104 or light strip 104B is visible for a user or patient in any case.

Preferably, the visualization device 104 or light strip 104B is integrated in the housing 108 of the holding apparatus 100 and/or is covered by a transparent element 108B as is in particular shown in FIG. 13.

The transparent element 108B is preferably light-transmissive, at least in part, in particular, such that light emitted from the visualization device 104 or light strip 104B is visible.

A display 104A, further light strips 104B and/or other visualization devices 104 can also be provided alternatively or additionally in or at the holding apparatus 100, in particular the first element 110 and/or second element 111.

Alternatively, or additionally, the holding apparatus 100 may comprise further transparent elements 108B, as shown in FIGS. 11 and 12 for the first element 110 or base or bottom by way of example.

Here, the holding apparatus 100 or receptacle 101 comprises or forms a transparent element 108B in the region where the medicament container 200 is covered by the holding apparatus 100 or receptacle 101. This ensures that the medicament container remains visible in this region.

In particular, also the second element 111 can comprise or be formed by a transparent element 108B, particularly preferably at least in the regions where the medicament container 200 is covered by the second element 111 and/or would not be visible otherwise.

The first element 110 preferably forms at least essentially the receptacle 101 for the medicament container 200.

In particular, the receptacle 101 or bottom/base 120 is designed such that the medicament container 200 or its reservoir 202 is held and/or secured in a fixed position, particularly preferably in a rotationally fixed manner. For this purpose, the receptacle 101 or bottom/base 120 comprises or forms preferably a depression which at least essentially resembles the shape of the medicament container 200 or its reservoir 202 and/or which, preferably tightly, fits the medicament container 200.

Particularly preferably, the receptacle 101 or bottom/base 120 can fit or receive medicament containers 200 of different size and/or shape, in particular at least two different medicament containers 200. In particular, the receptacle 101 comprises a bottom 101D and at least one step 101E as shown in FIG. 13.

Preferably, the bottom 101D extends at least essentially horizontally and/or forms the lowest part of the receptacle 101.

The step 101E preferably comprises a vertical wall which is integrally formed with the bottom 101D and a surface integrally formed with said wall and extending at least essentially horizontally. In particular, said surface is elevated with respect to the bottom 101D and/or at least essentially ring-shaped.

The bottom 101D is designed such that a medicament container 200 of appropriate size and shape can sit or rest on said bottom 101D, in particular the inner contour of the bottom 101D and the outer contour of the medicament container 200 or reservoir 202 being at least essentially the same.

Preferably, when the medicament container 200 is inserted into the holding apparatus 100 and/or in the operating state of the medication adherence management system 10, the step 101E, in particular its vertical wall, encloses a lower part of the medicament container 200 or reservoir 202, in particular such that the medicament container 200 is held and/or fixed in the holding apparatus 100 against horizontal movement.

The step 101E is designed such that a medicament container 200 of appropriate size and shape can sit or rest on said step 101E, in particular on its horizontal surface. The inner contour of the step 101E and the outer contour of the medicament container 200 or reservoir 202 are preferably at least essentially the same.

Preferably, when the medicament container 200 is inserted into the holding apparatus 100 and/or in the operating state of the medication adherence management system 10, vertical walls of the receptacle 101 or of a further step, preferably integrally formed with the step 101E, enclose a lower part of the medicament container 200 or reservoir 202, in particular such that the medicament container 200 is held and/or fixed in the holding apparatus 100 against horizontal movement.

Additionally, the receptacle 101 can comprise more than one step 101E, for example a second step 101E having its horizontal surface elevated with respect to the first step 101E. In this way, the receptacle 101 can be adapted to receive more than two medicament containers 200 of different size and/or shape.

FIG. 13 shows, by way of example, the medication adherence management system 10 with a medicament container 200 having dimensions such that it rests on the step 101E while being held in the receptacle 101. In particular, the medicament container 200 rests solely on the step 101E with a gap being formed between the bottom of the medicament container 200 and the bottom 101D of the receptacle 101. A medicament container 200 having smaller (appropriate) dimensions would preferably instead fit with its lower part into said gap and/or rest on the bottom 101D (not shown).

In particular, the holding apparatus 100, receptacle 101, bottom 101D or step 101E are designed such that a medicament container 200 having larger horizontal dimensions can sit or rest on the step 101E, while a medicament container 200 having smaller horizontal dimensions can sit or rest on the bottom 101D.

It is noted that the receptacle 101 can also be adapted such that not only medicament containers 200 of different size, but also of different shape can be received. For example, the bottom 101D could have a circular shape or outer contour, while the step 101E has an at least essentially quadratic outer contour.

However, it is preferred that the receptacle 101 is adapted to receive medicament containers 200 of essentially the same shape and only differing in size, in particular having a non-circular horizontal cross section and/or outer contour, particularly preferably an at least essentially quadratic horizontal cross section and/or outer contour.

The non-circular shape ensures in a particularly simple manner that the medicament container 200 is fixed in the receptacle 101 against rotational movement. This, for example, facilitates removing the lid 201 of the container 200 by unscrewing it while the reservoir 202 is held in the holding apparatus 100 in a rotationally fixed manner.

The second element 111 preferably forms or comprises a support, arm or stop for holding and/or supporting the medicament container 200.

In particular, the holding apparatus 100 or second element 111 at least essentially supports the medicament container 200 only on one vertical side.

In a vertical cross section, the holding apparatus 100 is preferably at least essentially L-shaped.

However, also other structural solutions are possible here, for example, the holding apparatus 100 or second element 111 forming two arms or stops supporting the medicament container 200 or a second element 111 which covers the reservoir 202 of the medicament container 200 completely.

Preferably, the second element 111 comprises, contains or receives the detection device 102. The detection device 102 is particularly preferably located close to the detection unit 204 of the medicament container 200 when the medicament container 200 is received by the holding apparatus 100. This ensures a reliable detection of medication activities.

Preferably, the data processing device 103 or control device 115 and the detection device 102 are associated with different elements of the holding apparatus 100, in particular the data processing device 103 or control device 115 being associated with the first element 110 and the detection device 102 being associated with the second element 111. Thus, preferably, an electrical connection 112 is provided, in particular extending through the first element 110 and the second element 111, in order to connect the detection device 102 and data processing device 103 or control device 115.

The second element 111 is preferably adapted such that it holds or fixes the medicament container 200 at an upper part, shoulder 209 and/or neck 207 of the medicament container

200. The second element 111 preferably comprises or forms a securing element 108A which is preferably designed such that it prevents the medicament container 200 to escape from a fixed position.

The securing element 108A preferably extends at least essentially in the horizontal direction and/or at least essentially parallel to the bottom or base 120 of the holding apparatus 100 and/or bottom 101D of the receptacle 101. The medicament container 200 is in particular held or fixed in the holding apparatus 100 from below by the first element 110, base 120 and/or receptacle 101 and from above by the second element 111 and/or securing element 108A.

Preferably, the second element 111 is at least essentially L-shaped in a vertical cross section, in particular with the support or arm forming one leg and the securing element 108A forming the other leg of the L-shape.

The securing element 108A is preferably fork-like and/or at least essentially U-shaped, and/or is adapted such that it abuts on and/or partly encloses the upper part, shoulder 209 and/or neck 207 of the medicament container 200. In particular, the securing element 108A can form or comprise fingers which are adapted to partly encompass the neck 207 and/or to rest on the shoulder 209. However, also other structural solutions are possible here, for example a securing element 108A which is shaped as in the third embodiment according to FIGS. 3 and 4.

Preferably, the securing element 108A and/or fingers thereof comprises/comprise or forms/form a contact element 116 which abuts on or contacts the medicament container 200, in particular its upper part, shoulder 209 and/or neck 207. The contact element 116 is preferably made of a softer and/or more elastic or flexible material than the rest of the holding apparatus 100 and/or medicament container 200, for example, made of rubber or plastics having the desired properties. This ensures that the medicament container 200 is tightly held and/or secured by the securing element 108A. In particular, providing an elastic and/or flexible contact element 116 ensures that the securing element 108A is able to adapt to medicament containers 200 with slightly different diameters of the neck 207.

Optionally, the contact element 116 can also be adhering or sticky, which preferably makes it easier to keep the medicament container 200 in the fixed position and/or to keep the medicament container 200 in contact with the contact element 116.

Alternatively, or additionally, also other parts of the holding apparatus 100 can be made of the same or a similar elastic material as the contact element 116, in particular parts of the receptacle 101 which hold the medicament container 200, with similar advantages being achieved for fixing the medicament container 200 in the receptacle 101. For example, the transparent element 108B shown in FIGS. 11 and 12, which essentially forms the sides of the receptacle 101, could be made of such material.

Particularly preferably, the medicament container 200 is fixed both by the receptacle 101, in particular at a lower part of the medicament container 200 or reservoir 202, and by the securing element 108A, in particular at an upper part, shoulder 209 and/or neck 207 of the medicament container 200. In particular, the medicament container 200 is supported or held from below by the base 120, receptacle 101, bottom 101D and/or step 101E and from above by the securing element 108A and/or contact element 116.

Thus, by providing the securing element 108A in addition to the receptacle 101, the medicament container 200 preferably is secured against vertical movement relative to the holding apparatus 100, such that, for example, the medication adherence management system 10 can be lifted up by grabbing the medicament container 200 without the medicament container 200 detaching from the holding apparatus 100.

Preferably, the securing element 108A rests on the shoulder 209 of the medicament container 200, in particular from above, and thus prevents any vertical movement of the medicament container 200 relative to the holding apparatus 100. Horizontal movement of the medicament container 200 relative to the holding apparatus 100 is preferably prevented by the receptacle 101, in particular by its vertical sides.

In order to facilitate inserting the medicament container 200 into the holding apparatus 100, the securing element 108A or contact element 116 has preferably an enclosing angle of 180° or less. However, it is also possible for the enclosing angle to be above 180°, for example by making the contact element 116 and/or fingers of the securing element 108A flexible and/or elastic such that it can give way when the medicament container 200 is pushed against the contact element 116.

The medication adherence management system 10 or holding apparatus 100 preferably comprises movable elements, in particular the first element 110 and second element 111 being movable relative to each other.

Preferably, the second element 111 is movable linearly in the vertical direction D. The height of the holding apparatus 100 is thus adaptable, in particular the position of the securing element 108A is changeable. Thus, the medication adherence management system 10 or holding apparatus 100 is preferably adaptable to receive medicament containers 200 of different height.

The securing element 108A preferably extends at least essentially transversal, in particular perpendicularly, to the movement direction of the second element 111 and/or vertical direction D.

Preferably, the holding apparatus 100 or first element 110 comprises or forms a preferably sled-like guidance 118 for movably guiding the movement of the second element 111 or further movable elements. However, other structural solutions are possible here, for example the second element 111 can comprise or form the guidance 118 instead.

The guidance 118 preferably restricts the relative movement of the movable elements 110, 111 to the desired linear movement in the vertical direction D.

Preferably, the holding apparatus 100 or first element 110 comprises a compartment 119 which receives the second element 111, at least in part. The compartment 119 can be part of the receptacle 101 or can be formed separately from the receptacle 101.

The second element 111 can preferably be moved in a telescopic manner, in particular into the compartment 119 and out of the compartment 119.

However, the medication adherence management system 10 or holding apparatus 100 can also be realized without a compartment 119. For example, the guidance 118 could be provided at the back and/or a vertical side on the outside of the first element 110 and/or base 120. In this case, the second element 111 is moveably guided on an outer side of the holding apparatus 100, in particular without being received by a compartment 119.

The holding apparatus 100 or first element 110 preferably comprises at least one locking device 117 for releasable locking of the first element 110 and the second element 111 and/or further movable elements against relative movement. However, other structural solutions are also possible here, like the second element 111 comprising the locking device 117.

Figure 14:
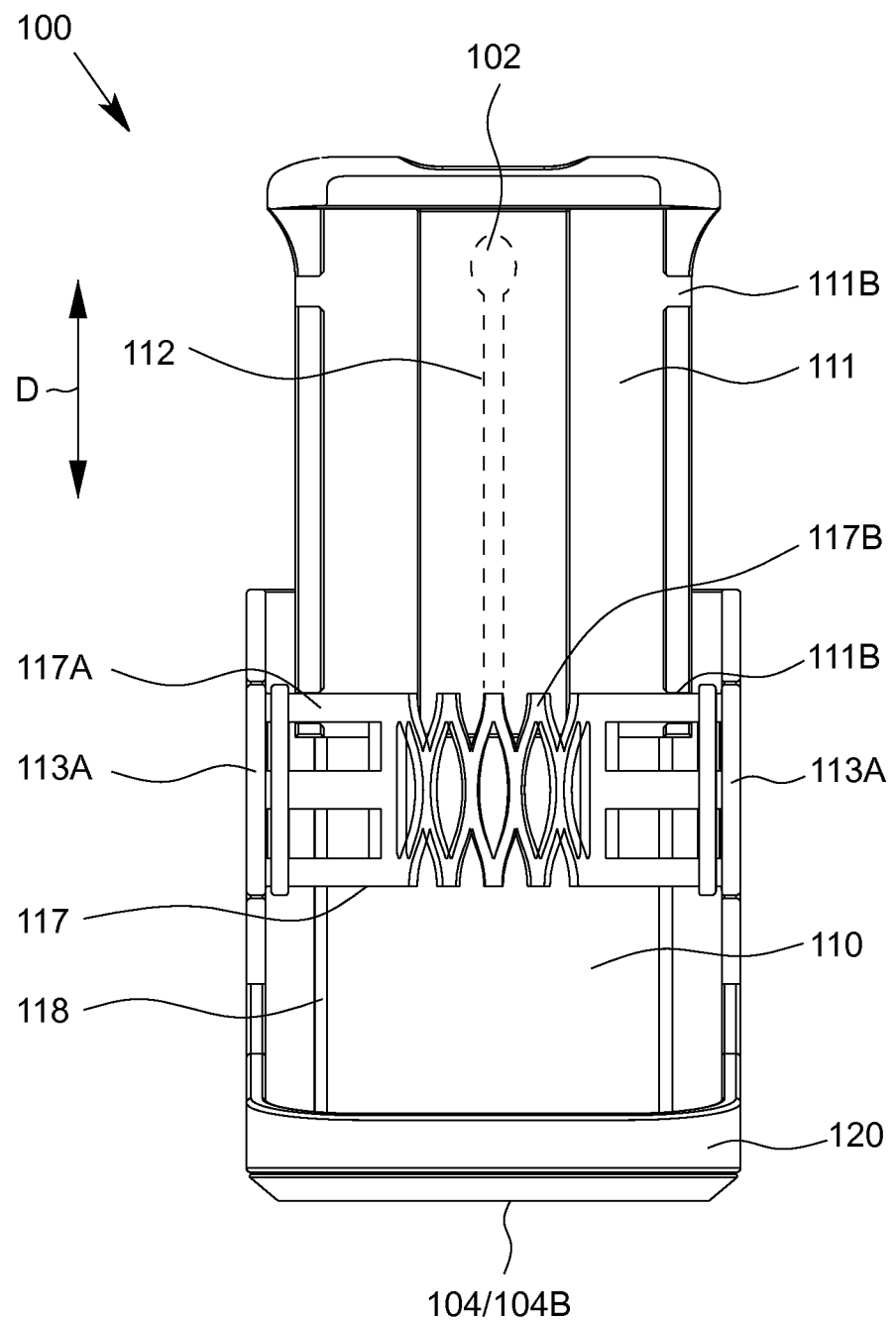
FIG. 14 is a schematic front view of the medication adherence management system according to FIG. 12.

FIG. 14 shows an example of such a locking device 117. FIG. 14 is a schematic front view according to FIG. 12 with the medicament container 200 being removed and/or in the inoperable state. Further, compared to FIG. 12, also the battery 107 or any other component has been removed such that the locking device 117, in the example located behind the battery 107, becomes visible in FIG. 14.

The locking device 117 preferably locks the movable elements, in particular the first element 110 and second element 111 by force-fit, form-fit and/or snap-fit against relative movement.

Preferably, the locking device 117 is adapted such that the movable elements 110, 111 are automatically locked against further relative movement when they reach a predefined position. In particular, the locking device 117 can also be adapted such that more than one predefined positions are provided.

Preferably, to release or unlock the movable elements 110, 111 and/or to enable movement of the movable elements 110, 111, the holding apparatus 100 and/or locking device 117 comprises or forms at least one release button 113A.

Particularly preferably, the holding apparatus 100 or locking device 117 comprises two release buttons 113A which are located on opposite sides of the holding apparatus 100.

More particularly preferably, the holding apparatus 100 or locking device 117 is adapted such that the moveable elements 110, 111 are only unlocked if both release buttons 113A are pressed simultaneously, in particular from opposite sides of the holding apparatus 100. This ensures that the moveable elements 110, 111 are not accidentally unlocked.

In the following, a preferred embodiment of a locking device 117 is explained with reference to FIG. 14. However, also other structural solutions are possible here.

The locking device 117 preferably comprises at least two latches 117A, a spring 117B and two release buttons 113A. In particular, the spring 117B is located in the center of the locking device 117 and the release buttons 113A are located at two opposite sides of the locking device 117, with the two latches 117A each connecting the respective release button 113A with the spring 117B. However, also other structural solutions are possible here, for example the locking device comprising only one release button 113A and corresponding latch 117A.

Particularly preferably, the locking device 117 is made of one piece and/or is held in the first element 110 by form-fit or is integrally formed therewith.

The latches 117A can preferably engage with recesses 111B provided in the second element 111, preferably in a force-fitting, form-fitting and/or snap-fitting manner. In particular, when a latch 117A engages with a recess 111B, relative movement of the moveable elements, in particular the first element 110 and second element 111, is prevented and/or the first element 110, second element 111 and/or further elements are locked against relative movement.

Preferably, the spring 117B exerts a force onto the locking device 117 or the latches 117A. The spring 117B and/or the force exerted by the spring 117B ensures that the latches 117A are held in and/or cannot escape from the recesses 111B, thus preventing relative movement of the moveable elements 110, 111.

Preferably, by pressing the release buttons 113A, in particular both release buttons 113A simultaneously, the spring 117B of the locking device 117 is compressed, such that preferably the force exerted on the locking device 117 and/or latches 117A is counteracted or compensated for.

The moveable elements 110, 111 are preferably lockable in different positions with respect to each other, in particular the second element 111 being lockable in different height positions.

Particularly preferably, the second element 111 comprises at least two recesses 111B being located at different vertical positions on the second element 111. Thus, moving the second element 111 with respect to the first element 110 causes the latches 117A to engage with different recesses 111B, resulting in different fixed height positions of the second element 111, in particular of the securing element 108A. However, also other structural solutions are possible here, for example providing only one recess 111B which is able to engage with a plurality of latches 117A which are arranged in different heights.

Preferably, the different locking positions of the moveable elements 110, 111 correspond to medicament containers 200 having different size and/or shape, in particular different height. In the example, the second element 111 comprises recesses 111B in two different vertical positions, resulting in two different locking positions of the holding apparatus 100. However, it is also possible to adapt the locking device 117 or holding apparatus 100 such that more than two different locking positions can be achieved.

Alternatively, it is also possible to provide a locking device 117 without a latch 117A and recess 111B. In this case, the force of the spring 117B is preferably exerted directly onto the second element 111, pressing the second element 111 against the first element 110 and/or locking the moveable elements 110, 111 from moving relative to each other by force-fit. In this case, the height of the holding apparatus 100 can be adapted continuously and/or the holding apparatus 100 can be adapted to any height between a minimum height and a maximum height.

Inserting the medicament container 200 into the holding apparatus 100 can be carried out by first moving the second element 111 and/or securing element 108A into its upper most position, and then inserting the medicament container 200 into the securing element 108A, in particular such that it hangs being held by the securing element 108A. Subsequently, the second element 111 and/or securing element 108A can be lowered and/or moved relative to the first element 110 and/or bottom or base 120 of the holding apparatus 100 together with the medicament container 200, until the position in which the medicament container 200 rests in the receptacle 101 is reached. Preferably, this position also corresponds to one of the locking positions of the holding apparatus 100.

Alternatively, or additionally, to being moveable for adapting to medicament containers 200 of different size and/or different shape, the elements 110, 111 can thus also be movable for making it possible or easier to insert the medicament container 200 into the holding apparatus 100 or receptacle 101 and/or for securing or fixing the medicament container 200 after it has been inserted. In this case it is also possible for the moveable elements 110, 111 to be lockable in only one position, if no height adjustment for different medicament containers 200 is required.

Alternatively, or additionally, to inserting the medicament container 200 by moving the second element 111, the holding apparatus 100, receptacle 101 and/or securing element 108A can be adapted such that the medicament container 200 can be inserted into the holding apparatus 100 from the side. In this case, the medicament container 200 is preferably inserted into the holding apparatus 100 by first inserting the medicament container 200 or its reservoir 202 into the receptacle 101 and then pushing the medicament container 200 or its neck 207 or shoulder 209 against the securing element 108A or contact element 116.

The receptacle 101 can be adapted such that a medicament container 200 upon insertion centers itself in the receptacle 101. This can in particular be achieved by the walls of the receptacle 101 and/or step 101E being beveled towards the center of the receptacle 101, at least in the lower part of the receptacle 101 and/or the region of the bottom 101D.

When inserted into the holding apparatus 100 and/or in the operating state, the medicament container 200 is preferably held or fixed in the holding apparatus 100 or receptacle 101 by force-fit, form-fit and/or snap-fit, in particular such that it cannot detach from the holding apparatus 100 by itself and/or when used by a user or patient, i.e. when the medication adherence management system 10 is lifted up or tilted, a lid 201 is unscrewed or otherwise removed from the medicament container 200, or the like.

Preferably, the medication adherence management system 10 is only in its operating state when the medicament container 200 is fully inserted and fixed or secured in the holding apparatus 100, in particular only when the holding apparatus 100 is adjusted to the correct height and the movable elements 110, 111 are locked against relative movement. If the medication adherence management system 10 is in the inoperable state and/or if the medicament container 200 is not inserted into or received by the holding apparatus 100 correctly, the system 10 can preferably notify the user or patient, for example, by a display 104A or other notification device 104, how to bring the medication adherence management system 10 into its operating state, in particular giving instructions how to move the moveable elements 110, 111 of the holding apparatus 100 or the like.

Figure 15:
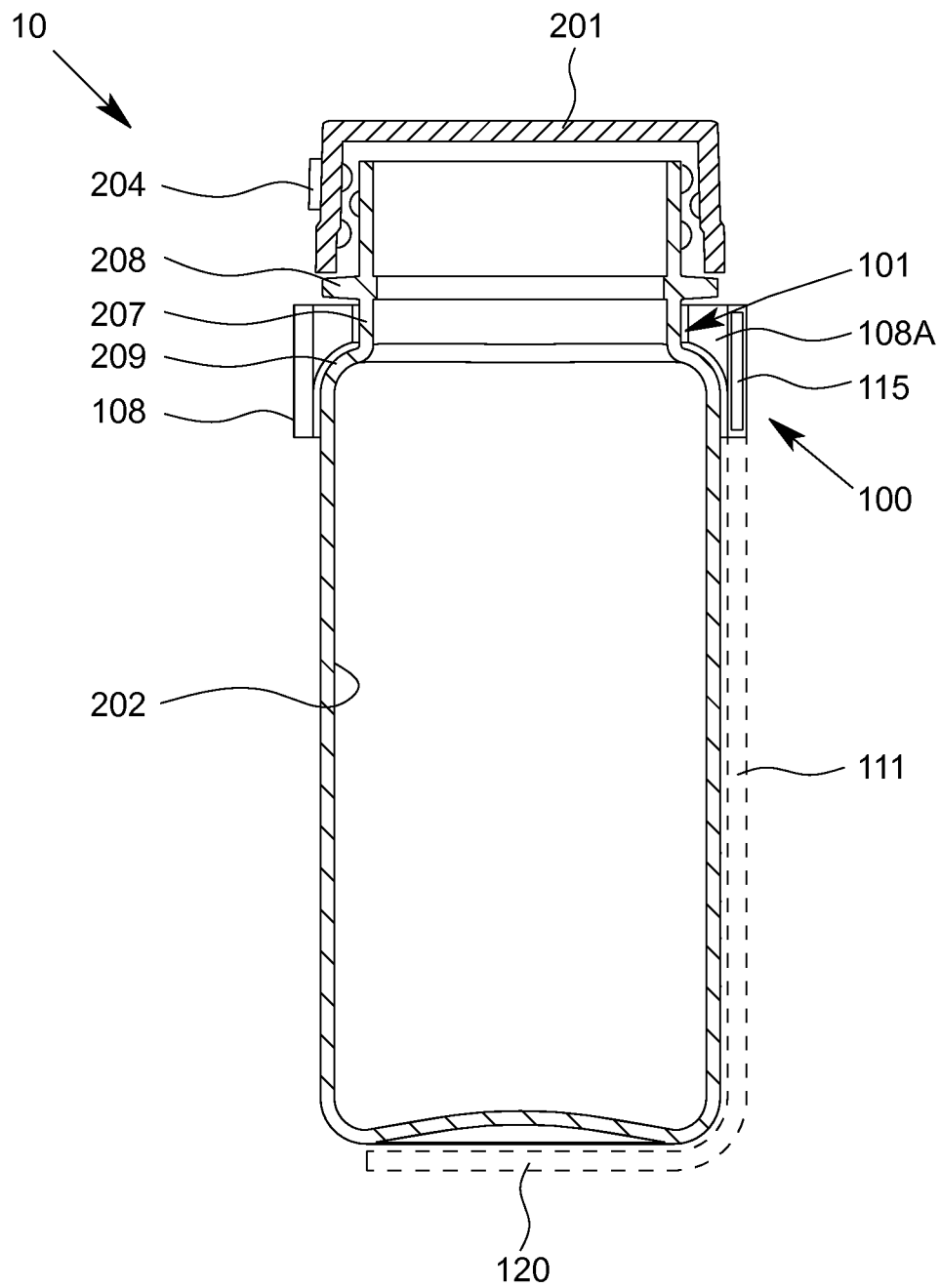
FIG. 15 is a schematic sectional side view of an eighth embodiment of the medication adherence management system.

FIG. 15 shows the medication adherence management system 10 according to an eighth embodiment in a schematic sectional side view.

Preferably, the holding apparatus 100 or housing 108 is at least essentially formed as a collar or ring enclosing an upper part, neck 207 and/or shoulder 209 of the medicament container 200.

Preferably, the holding apparatus 100 or housing 108 fully encloses the medicament container 200 or a circumference thereof. However, it is also possible that the holding apparatus 100 only partly encloses the medicament container 200 and/or is at least essentially formed as a section of a collar or ring.

When connected to the medicament container 200, the holding apparatus 100 is preferably only located in the region of the upper part, shoulder 209 and/or neck 207 of the medicament container 200. Alternatively, the holding apparatus 100 can also extend further down the reservoir 202 and/or around the bottom of the container 200.

The holding apparatus 100 is at least essentially formed ring-like, having an inner circumferential surface which at least essentially resembles the outer shape of the medicament container 200 and/or forms the receptacle 101. In particular, for the medicament container 200 shown, a horizontal section of the inner circumferential surface is at least essentially circular in the region of the neck 207 and at least essentially square-shaped in the region of the shoulder 209 and/or reservoir 202. However, also other structural solutions are possible here when used with different medicament containers 200, as for example a cardboard package.

The essentially square-shaped medicament container 200 or reservoir 202 and corresponding receptacle 101 or inner circumferential surface of the holding apparatus 100 ensures that the holding apparatus 100 and medicament container 200 are preferably rotatably coupled. Hence, when unscrewing the lid 201, the reservoir 202 does not rotate relative to the holding apparatus 100.

The holding apparatus 100 is preferably held, fixed or secured at the medicament container 200 by force-fit, form-fit and/or snap-fit.

In particular, the holding apparatus 100 forms or comprises a securing element 108A. The securing element 108A is preferably adapted to engage with a tapered part or neck 207 of the medicament container 200 and/or to rest or abut on a shoulder 209 of the medicament container 200.

The securing element 108A can extend along the whole inner circumferential surface of the holding apparatus 100 or can be formed by one or more of protrusions extending from the inner circumferential surface and/or protruding into the receptacle 101.

In addition, the medicament container 200 can also comprise a flange 208 around its neck 207, said flange 208 partly extending over the holding apparatus 100 or securing element 108A. In particular, the securing element 108A can be adapted to engage in the recess formed by or between the flange 208 and the shoulder 209. This ensures that the holding apparatus 100 is fixed at the medicament container 200 against vertical movement, in particular from above by the flange 208 and from below by the shoulder 209.

The securing element 108A can in particular form or comprise an elastic, flexible and/or adhering contact element 116 as described in the previous embodiment.

The holding apparatus 100 can be adapted such that it is connectable with the medicament container 200 from above. Preferably, the holding apparatus 100 is automatically fixed or secured at the medicament container 200 when placed on or at the medicament container 200 from above. In particular, the securing element 108A or protrusions thereof are flexible and give way when passed along the flange 208.

Alternatively, or additionally, the holding apparatus can be adapted such that it is connectable with the medicament container 200 from a peripheral side.

For this purpose, the holding apparatus 100 is preferably openable. In this case, the holding apparatus 100 is preferably formed of two elements connected with a hinge or the like at which the two elements are pivotable with respect to each other. The holding apparatus 100 may further comprise a latching mechanism for securing the two pivotable elements with each other.

Thus, to connect the holding apparatus 100 and medicament container 200 with each other, the holding apparatus 100 can be opened by pivoting the two elements. In particular, the opening and/or receptacle 101 of the holding apparatus 100 can be enlarged in this way, such that the medicament container 200 can be received from the side. The holding apparatus 100 can subsequently be secured at the medicament container 200 by closing the holding apparatus 100.

A holding apparatus 100 which forms only a section of a collar or ring is preferably adapted flexible such that it can be put around the neck 207 and/or shoulder 209 of the medicament container 200 from a peripheral side, in particular without the need of pivotable elements.

The holding apparatus 100 or housing 108 preferably comprises the control device 115, detector device 102, data processing device 103, memory 103A, time base 103B, visualization device 104, user interface 105, communication device 106, battery 107 and/or any further devices. In particular, some or all of these devices can be formed ring-like or like the section of a ring. This ensures that the devices properly fit into the holding apparatus 100 or housing 108.

Additionally, the holding apparatus 100 may comprise the second element 111 as a further element, the previously described collar-like element forming in particular the first element 110. In FIG. 15 the further or second element 111 is indicated with dashed lines.

The further or second element 111 preferably secures the medicament container 200 at or from the bottom. In particular, in a vertical section, the further or second element 111 may be at least essentially L-shaped. One leg of the L-shape preferably forms an arm or stop extending along one vertical side or edge of the medicament container 200 or reservoir 202. The other leg of the L-shape preferably extends at least essentially horizontally and/or parallel to the bottom of the medicament container 200 and/or forms a base 120 of the medication adherence management system 10 or holding apparatus 100.

In particular, the medicament container 200 is held, fixed or secured against vertical movement in the holding apparatus 100 by the second element 111 from below and by the collar-like or first element 110 from above. The collar-like or first element 110 preferably fixes or secures the medicament container 200 against horizontal movement.

The further or second element 111 may either be fixed to the collar-like or first element 110 non-detachably or can also be removable from said element 110 and/or holding apparatus 100. The further or second element 111 can also be designed as a modular element, being exchangeable, for example to adapt to medicament containers 200 of different size and/or shape.

Preferably, the further or second element 111 is movable relative to the collar-like or first element 110. The holding apparatus 100 is thus preferably adaptable to medicament containers 200 of different height.

Particularly preferably, the further or second element 111 is movable in a way as described for the previous embodiment, but with the position of the first element 110 and second element 111 being reversed, in particular the first element 110 comprising or forming the securing element 108A and the second element 111 comprising or forming the base 120.

Preferably, the detection unit 204 is integrated or attached to the lid 201 of the medicament container 200, e.g., by means of a label, an adhesive, the cap 114, or the like, preferably at an upper surface, inner surface or periphery of the lid 201.

The different embodiments, the features and aspects of the different embodiments and/or mentioned above or in the claims can be realized independently from each other and also in any combination.

In particular, the present invention relates also to any one of the following aspects which can be realized independently or in any combination, also in combination with any aspects described above or in the claims:

1. Medication adherence management system (10) comprising a holding apparatus (100) for a medicament container (200),
wherein the holding apparatus (100) comprises:
a receptacle (101) for holding a medicament container (200),
a detector device (102) for wirelessly recognizing an opening and closing of the medicament container (200) in the receptacle (101), and
a data processing device (103) for processing data of said detector device (102) to register a medication activity when the medicament container (200) is opened and closed.

2. Medication adherence management system (10) comprising a holding apparatus (100) for a medicament container (200), preferably according to aspect 1,
wherein the holding apparatus (100) comprises:
a receptacle (101) for holding a medicament container (200),
a detector device (102) for weighing the medicament container (200) in the receptacle (101), and
a data processing device (103) for processing data of said detector device (102) to register a medication activity when the medicament container (200) loses weight.

3. Medication adherence management system (10) comprising a holding apparatus (100) with a receptacle (101) for holding a medicament container (200), preferably according to one of the preceding aspects,
wherein the medication adherence management system (10) or holding apparatus (100) comprises a detector device (102) and/or data processing device (103) for registering a medication activity, opening or closing of the medicament container (200) and/or loss of weight of the medicament container (200),
characterized
in that the medication adherence management system and/or holding apparatus (100) and/or a housing (108) thereof comprises multiple modular elements which are separable from each other, at least a first element (110) and a second element (111).

4. Medication adherence management system according to aspect 3 characterized in that the first element (110) comprises the data processing device (103).

5. Medication adherence management system according to aspect 3 or 4 characterized in that the first element (110) comprises a visualization and/or notification device (104), user interface (105), communication device (106) and/or battery (107).

6. Medication adherence management system according to one of the aspects 3 to 5 characterized in that the first element (110) forms a base or bottom of the medication adherence management system (10) or the holding apparatus (100).

7. Medication adherence management system according to one of the aspects 3 to 6 characterized in that the second element (111) forms at least essentially the receptacle (101).

8. Medication adherence management system according to one of the aspects 3 to 7 characterized in that the second element (111) forms a sleeve for the medicament container (200) or a reservoir (202) thereof.

9. Medication adherence management system according to one of the aspects 3 to 8 characterized in that the second element (111) forms a support, arm and/or shoulder holding and/or supporting the medicament container (200).

10. Medication adherence management system according to one of the aspects 3 to 9 characterized in that the second element (111) comprises the detector device (102).

11. Medication adherence management system according to one of the aspects 3 to 10 characterized in that the second element (111) comprises an electrical connection (112) which connects the detector device (102) located in the second element (111) with the data processing device (103) located in the first element (110).

12. Medication adherence management system according to one of the aspects 3 to 11 characterized in that the system (10) and/or holding apparatus (100) and/or its housing (108) comprises a cap (114) or a cover (109) as additional element.

13. Medication adherence management system according to aspect 12, characterized in that the cap (114) or cover (109) comprises a detection unit (204), preferably wirelessly, detectable by the detector device (102).

14. Medication adherence management system according to one of the aspects 3 to 13 characterized in that some or all of the modular elements are connected together detachably by force-fit, form-fit and/or snap-fit.

15. Medication adherence management system according to aspect 14 characterized in that the holding apparatus (100) has at least one release button (113A) to release or unlock some or all of the modular elements.

16. Medication adherence management system according to one of the aspects 3 to 15, characterized in that some or all of the modular elements are exchangeable for adapting the holding apparatus (100) or receptacle (101) to different sizes and/or different shapes of the medicament container (200).

17. Medication adherence management system (10) comprising a holding apparatus (100) with a receptacle (101) for holding a medicament container (200), preferably according to one of the preceding aspects,
wherein the medication adherence management system (10) or holding apparatus (100) comprises a detector device (102) and/or data processing device (103) for registering a medication activity, opening or closing of the medicament container (200) and/or loss of weight of the medicament container (200),
characterized
in that the holding apparatus (100) comprises elements, at least a first element (110) and second element (111), which are movable relative to each other for holding and/or fixing the medicament container (200).

18. Medication adherence management system according to aspect 17, characterized in that the first element (110) and second element (111) form together a drawer which can be opened for inserting the medicament container (200).

19. Medication adherence management system according to aspect 17 or 18, characterized in that the medicament container (200) is fixed or secured by closing the drawer and/or by moving the second element (111) into a receptacle (101B) of the first element (110).

20. Medication adherence management system according to one of the aspects 17 to 19, characterized in that the first element (110) and second element (111) can be rotated with respect to each other.

21. Medication adherence management system according to one of the aspects 17 to 20, characterized in that moving the first element (110) and/or second element (111) activates a clamping mechanism which fixes or secures the medicament container (200).

22. Medication adherence management system according to one of the aspects 17 to 21, characterized in that the first element (110) and second element (111) are inseparable from each other.

23. Medication adherence management system according to one of the aspects 17 to 21, characterized in that the first element (110) and/or second element (111) and/or further elements are separable from each other and/or are exchangeable.

24. Medication adherence management system according to one of the preceding aspects, characterized in that the medication adherence management system (10) comprises the medicament container (200) which is held by the holding apparatus (100).

25. Medication adherence management system (10) comprising a holding apparatus (100) with a receptacle (101) holding a medicament container (200), preferably according to one of the preceding aspects,
wherein the medication adherence management system (10) or holding apparatus (100) comprises a detector device (102) and/or data processing device (103) for registering a medication activity, opening or closing of the medicament container (200) and/or loss of weight of the medicament container (200),
wherein the medicament container (200) comprises a lid (201) and a reservoir (202) for a medicament (203),
characterized
in that the holding apparatus (100) holds the medicament container (200) at a tapered part and/or neck (207) located between the lid (201) and the reservoir (202).

26. Medication adherence management system according to aspect 25, characterized in that the medication adherence management system (10) is adapted so that the medicament container (200) hangs in the holding apparatus (100) while being held at its tapered part and/or neck (207).

27. Medication adherence management system according to aspect 25 or 26, characterized in that the tapered part and/or neck (207) comprises a flange (208).

28. Medication adherence management system according to aspect 27, characterized in that the holding apparatus (100) comprises an opening (111A) at the top of the receptacle (101), the diameter of the opening (111A) being larger than the diameter of the tapered part and/or neck (207) but smaller than the diameter of the flange (208).

29. Medication adherence management system according to aspect 28, characterized in that the medication adherence management system (10) is designed so that the flange (208) is resting on the edge of the opening (111A).

30. Medication adherence management system according to aspect 28 or 29, characterized in that the opening (111A) can be enlarged for inserting or removing the medicament container (200).

31. Medication adherence management system according to one of the aspects 25 to 30, characterized in that the receptacle (101) is designed to receive differently shaped and/or sized reservoirs (202) of medical containers (200).

32. Medication adherence management system (10) comprising a holding apparatus (100) with a receptacle (101) holding a medicament container (200), preferably according to one of the preceding aspects,
wherein the medication adherence management system (10) or holding apparatus (100) comprises a detector device (102) and/or data processing device (103) for registering a medication activity, opening or closing of the medicament container (200) and/or loss of weight of the medicament container (200),
wherein the medicament container (200) comprises a removable lid (201) and a reservoir (202) for a medicament (203),
characterized
in that the medication adherence management system (10) or holding apparatus (100) comprises a cap (114) which is adapted to receive and connect with the lid (201) in a force-fit, form-fit and/or snap-fit manner.

33. Medication adherence management system according to aspect 32, characterized in that the cap (114) and the lid (201) form a unit which is removable from and attachable to the reservoir (202).

34. Medication adherence management system according to aspect 32 or 33, characterized in that a tangential force exerted onto the cap (114) is transferred onto the lid (201).

35. Medication adherence management system according to one of the aspects 32 to 34, characterized in that the cap (114) can be clipped or plugged onto the lid (201) from the top.

36. Medication adherence management system according to one of the aspects 32 to 35, characterized in that the cap (114) completely covers the lid (201).

37. Medication adherence management system according to one of the aspects 32 to 36, characterized in that the cap (114) can be removed from the lid (201).
38. Medication adherence management system according to one of the aspects 32 to 36, characterized in that the cap (114) is non-detachably connected with the lid (201).
39. Medication adherence management system according to one of the aspects 32 to 38, characterized in that the cap (114) engages with grooves (201A) provided on the lid (201).
40. Medication adherence management system according to one of the aspects 32 to 39, characterized in that the cap (114) comprises a detection unit (204), preferably wirelessly, detectable by the detector device (102).
41. Medication adherence management system according to one of the aspects 24 to 40, characterized in that the medicament container (200) comprises a detection unit (204), preferably wirelessly, detectable by the detector device (102).
42. Medication adherence management system according to aspect 40 or 41, characterized in that the detection unit (204) comprises an optical reference element, particularly a reference pattern, a magnet and/or an electronic reference element, particularly an RFID tag.
43. Medication adherence management system according to one of the aspects 24 to 42, characterized in that the reservoir (202) of the medicament container (200) has a non-circular horizontal cross section.
44. Medication adherence management system according to one of the preceding aspects, characterized in that the holding apparatus (100) or receptacle (101) holds the medicament container (200) in a rotationally fixed manner.
45. Medication adherence management system according to one of the preceding aspects, characterized in that the detector device (102) is capable of an optical, an electronical, a magnetic, a remote and/or an ultrasonic interaction with the medicament container (200) or a detection unit (204) thereof.
46. Medication adherence management system according to one of the preceding aspects, characterized in that the detector device (102) is capable of recognizing the type of medicament (203) in the medicament container (200) and/or the size of the medicament container (200), preferably by recognizing or reading at least a part of or a detection unit (204) of the medicament container (200).
47. Medication adherence management system according to one of the preceding aspects, characterized in that the data processing device (103) comprises or is associated with a unit for determining the time, location and/or temperature at the place of the medication adherence management system (10).
48. Medication adherence management system according to one of the preceding aspects, characterized in that the holding apparatus (100) comprises a visualization and/or a notification device (104).
49. Medication adherence management system according to one of the preceding aspects, characterized in that the holding apparatus (100) comprises a user interface (105) allowing to control the medication adherence management system (10).
50. Medication adherence management system according to one of the preceding aspects, characterized in that the medication adherence management system (10), the holding apparatus (100) or the data processing device (103) comprises or is associated with a communication device (106) or interface for communicating with an external device (300) and/or a network.
51. Medication adherence management system according to one of the preceding aspects, characterized in that the medication adherence management system (10) is operationally independent from an external power supply.
52. Medication adherence management system according to one of the preceding aspects, characterized in that the holding apparatus (100) or a housing (108) thereof is at least partially sealed, preferably substantially watertight and/or gastight.
53. Medication adherence management system according to any of the preceding aspects, characterized in that the system (10) and/or holding apparatus (100) and/or or receptacle (101) is/are adapted to completely receive and/or cover the medicament container (200).
54. Medication adherence management system according to any of the preceding aspects, characterized in that the holding apparatus (100) is designed such that the medicament container (200) and/or a label (206) thereof is at least essentially visible in each state of the medication adherence management system (10).
55. Medication adherence management system according to aspect 54, characterized in that the holding apparatus (100) or a housing (108) thereof has a window or opening and/or is at least essentially transparent.
56. Medication adherence management system according to one of the preceding aspects, characterized in that the receptacle (101) at least substantially resembles the outer shape of the medicament container (200).
57. Medication adherence management system according to one of the preceding aspects, characterized in that the receptacle (101) comprises at least one securing element (108A) preventing the medicament container (200) to escape from a fixed position.
58. Method for medication adherence management, wherein a medicament container (200) containing a plurality of doses of a medicament (203) is held by a holding apparatus (100), a detector device (102) of said holding apparatus (100) remotely detects an opening and closing of the medicament container (200), and
a data processing device (103) registers a medication activity each time the medicament container (200) is opened and closed.
59. Method according to aspect 58, characterized in that after an activity and/or at specific times and/or upon request data is transferred to a receiver, particularly a server or a data center, via a communication device (106).
60. Method according to aspect 59, characterized in that the transferred data concerns one or more events of activity, the number of activities, times of activity events and/or a reference value set in the data processing device (103).
61. Method according to any of the aspects 58 to 60, characterized in that the transferred data from the data processing device (103) is evaluated in a remote location automatically and/or by a medical expert.
62. Method according to aspect 61, characterized in that subsequently control data is transferred to the data processing device (103).

What is claimed is:
1. A medication adherence management system comprising:
a holding apparatus with a receptacle for holding or connecting to a medicament container, and
a detector device and a data processing device or control device for registering at least one of opening or closing of the medicament container,
wherein the holding apparatus comprises at least a first element and a second element, which are movable relative to each other for at least one of holding the medicament container and adapting to medicament containers of different size or different shape, wherein the second element comprises the detector device, wherein the medication adherence management system or holding apparatus comprises a locking device for releasably locking the at least two elements against relative movement, and wherein the locking device is able to lock the at least two elements in at least two different positions with respect to each other.

2. The medication adherence management system according to claim 1, wherein the different positions correspond to medicament containers of different size or shape.

3. The medication adherence management system according to claim 1, wherein the first element comprises, contains or receives at least one of the data processing device, the control device, a visualization device, a notification device, a user interface, a communication device and a battery.

4. The medication adherence management system according to claim 1, wherein the first element forms or is fixedly connected with a bottom or base of the medication adherence management system or the holding apparatus.

5. The medication adherence management system according to claim 1, wherein the second element forms at least one of a sleeve for the medicament container and a support, arm or stop for holding or supporting the medicament container.

6. The medication adherence management system according to claim 1, wherein the second element comprises the detector device.

7. The medication adherence management system according to claim 1, wherein the first element and second element are inseparable from each other.

8. The medication adherence management system according to claim 1, wherein the medication adherence management system or the holding apparatus or a housing thereof comprises multiple modular elements which are at least one of separable from each other and exchangeable, the first element and the second element being modular elements.

9. The medication adherence management system according to claim 8, wherein some or all of the modular elements are exchangeable for adapting the holding apparatus or receptacle to medicament containers of different size or different shape.

10. A medication adherence management system comprising:
a holding apparatus with a receptacle for holding or connecting to a medicament container, and
a detector device and a data processing device or control device for registering at least one of opening or closing of the medicament container,
wherein the holding apparatus comprises the data processing device or control device for processing data of said detector device to register a medication activity when the medicament container is opened and closed within a predetermined period of time,
wherein the holding apparatus is adapted to hold or to be connected to the medicament container at a tapered part, shoulder or neck of the medicament container, and
wherein the holding apparatus or a contact element thereof comprises an opening at the top of the receptacle, wherein the opening is able to be enlarged for inserting or removing the medicament container.

11. The medication adherence management system according to claim 1,
wherein the holding apparatus further comprises a data processing device or control device for processing data of said detector device to register a medication activity when the medicament container is opened and closed within a predetermined period of time.

12. A medication adherence management system comprising:
a holding apparatus with a receptacle for holding or connecting to a medicament container, and
a detector device and a data processing device or control device for registering at least one of opening or closing of the medicament container,
wherein the holding apparatus comprises the data processing device or control device for processing data of said detector device to register a medication activity when the medicament container is opened and closed within a predetermined period of time,
wherein the holding apparatus is adapted to hold or to be connected to the medicament container at a tapered part, shoulder or neck of the medicament container,
wherein the holding apparatus or a housing thereof comprises or forms at least one securing element for preventing the medicament container escaping from a fixed position, and
wherein the securing element is fork-like, U-shaped or comprises or forms fingers for encompassing or partly encompassing the medicament container or a neck thereof.

13. The medication adherence management system according to claim 12, wherein the securing element comprises or forms a contact element which is made of at least one of a soft, elastic and adhering material.

14. The medication adherence management system according to claim 12, wherein the securing element at least one of extends at least essentially parallel to a base of the holding apparatus, and rests on the medicament container or a shoulder thereof from above.

15. The medication adherence management system according to claim 12, wherein the securing element is adapted to prevent the medicament container from escaping in a vertical direction, while the receptacle is adapted to support the medicament container from below and to prevent the medicament container from escaping in a horizontal direction.

16. The medication adherence management system according to claim 10, wherein the holding apparatus or receptacle has means for holding the medicament container in a rotationally fixed manner.

17. The medication adherence management system according to claim 12, wherein the medication adherence management system comprises the medicament container which is held by the holding apparatus, and wherein the medicament container comprises a detection unit detectable by the detector device.

18. A medication adherence management system comprising:
a holding apparatus with a receptacle holding or being connected to a medicament container, and
a detector device and a data processing device or control device for registering at least one of a medication activity, opening or closing of the medicament container, and loss of weight of the medicament container,
wherein the medicament container comprises a removable lid and a reservoir for a medicament, wherein the medication adherence management system further comprises a cap which is adapted to receive and connect with the lid in at least one of a force-fit, form-fit and snap-fit manner. and wherein the cap comprises a detection unit detectable by the detector device.

19. The medication adherence management system according to claim 18, wherein the detection unit comprises at least one of an optical reference element, a magnet and an electronic reference element.

20. The medication adherence management system according to claim 17, wherein the detector device is capable of or adapted for at least one of an optical, an electronic, a magnetic, a remote and an ultrasonic interaction with or detection of the medicament container or a detection unit thereof.

21. The medication adherence management system according to claim 17, wherein the detector device is capable of recognizing at least one of the type of medicament in the medicament container and the size of the medicament container, by recognizing or reading at least a part of a detection unit of the medicament container.

22. The medication adherence management system according to claim 17, wherein the medication adherence management system, the holding apparatus or the data processing device or control device comprises or is associated with a communication device for communicating with an external device or a network.

23. The medication adherence management system according to claim 22, wherein the communication device is adapted to transfer data to a receiver, in at least one of the following events: after an activity, at specific times, and upon request.

24. The medication adherence management system according to claim 23, wherein the data contains or is related to at least one of an event of activity, a plurality of events of activity, the number of activities, times of activity events and a medication schedule.

25. The medication adherence management system according to claim 23, wherein means are provided for enabling the data to be evaluated in a remote location.

26. The medication adherence management system according to claim 10, wherein the receptacle, holding apparatus or a base thereof is adapted to support the medicament container from at least one of below and on the vertical sides, preventing the medicament container to escape from a fixed position.

27. The medication adherence management system according to claim 10, wherein the medication adherence management system is adapted to receive the medicament container so that the medicament container can hang in the holding apparatus while being held at an upper part or tapered part or neck.

28. The medication adherence management system according to claim 12, wherein the receptacle, holding apparatus or a base thereof is adapted to support the medicament container from at least one of below and on the vertical sides, preventing the medicament container to escape from a fixed position.

29. The medication adherence management system according to claim 12, wherein the medication adherence management system is adapted to receive the medicament container so that the medicament container can hang in the holding apparatus while being held at an upper part or tapered part or neck.

30. The medication adherence management system according to claim 1, wherein the holding apparatus further comprises a data processing device or control device for processing data of said detector device to register a medication activity when the medicament container is opened and closed within a predetermined period of time and wherein the first element comprises, contains or receives at least one of the data processing device, the control device, a visualization device, a notification device, a user interface, a communication device and a battery.

31. A medication adherence management system comprising:
    a holding apparatus with a receptacle for holding or connecting to a medicament container, and
    a detector device and a data processing device or control device for registering at least one of opening or closing of the medicament container,
    wherein the holding apparatus comprises at least a first element and a second element, which are movable relative to each other for at least one of holding the medicament container and adapting to medicament containers of different size or different shape,
    wherein the first element comprises, contains or receives at least one of the data processing device, the control device, a visualization device, a notification device, a user interface, a communication device and a battery,
    wherein the medication adherence management system or holding apparatus comprises a locking device for releasably locking the at least two elements against relative movement, and
    wherein the locking device is able to lock the at least two elements in at least two different positions with respect to each other.

32. The medication adherence management system according to claim 31, wherein the different positions correspond to medicament containers of different size or shape.

33. The medication adherence management system according to claim 31, wherein the first element forms or is fixedly connected with a bottom or base of the medication adherence management system or the holding apparatus.

34. The medication adherence management system according to claim 31, wherein the second element forms at least one of a sleeve for the medicament container and a support, arm or stop for holding or supporting the medicament container.

35. The medication adherence management system according to claim 31, wherein the first element and second element are inseparable from each other.

36. The medication adherence management system according to claim 31, wherein the medication adherence management system or the holding apparatus or a housing thereof comprises multiple modular elements which are at least one of separable from each other and exchangeable, the first element and the second element being modular elements.

37. The medication adherence management system according to claim 36, wherein some or all of the modular elements are exchangeable for adapting the holding apparatus or receptacle to medicament containers of different size or different shape.

38. The medication adherence management system according to claim 31, wherein the holding apparatus further comprises a data processing device or control device for processing data of said detector device to register a medication activity when the medicament container is opened and closed within a predetermined period of time.

39. A medication adherence management system comprising:
- a holding apparatus with a receptacle for holding or connecting to a medicament container, and
- a detector device and a data processing device or control device for registering at least one of opening or closing of the medicament container,
- wherein the holding apparatus comprises at least a first element and a second element, which are movable relative to each other for at least one of holding the medicament container and adapting to medicament containers of different size or different shape,
- wherein the medication adherence management system or holding apparatus comprises a locking device for releasably locking the at least two elements against relative movement,
- wherein the locking device is able to lock the at least two elements in at least two different positions with respect to each other, and
- wherein the medication adherence management system or the holding apparatus or a housing thereof comprises multiple modular elements which are at least one of separable from each other and exchangeable, the first element and the second element being modular elements.

40. A medication adherence management system comprising:
- a holding apparatus with a receptacle for holding or connecting to a medicament container, and
- a detector device and a data processing device or control device for registering at least one of opening or closing of the medicament container,
- wherein the holding apparatus comprises the data processing device or control device for processing data of said detector device to register a medication activity when the medicament container is opened and closed within a predetermined period of time,
- wherein the holding apparatus comprises at least a first element and a second element, which are movable relative to each other for at least one of holding the medicament container and adapting to medicament containers of different size or different shape,
- wherein the medication adherence management system or holding apparatus comprises a locking device for releasably locking the at least two elements against relative movement, and
- wherein the locking device is able to lock the at least two elements in at least two different positions with respect to each other.

* * * * *